(12) United States Patent
Lin

(10) Patent No.: US 11,262,938 B2
(45) Date of Patent: Mar. 1, 2022

(54) METHOD AND APPARATUS FOR PERFORMING ACCESS MANAGEMENT OF A MEMORY DEVICE WITH AID OF DEDICATED BIT INFORMATION

(71) Applicant: Silicon Motion, Inc., Hsinchu County (TW)

(72) Inventor: Yu-Chih Lin, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 17/082,032

(22) Filed: Oct. 28, 2020

(65) Prior Publication Data

US 2021/0349655 A1 Nov. 11, 2021

Related U.S. Application Data

(60) Provisional application No. 63/020,025, filed on May 5, 2020.

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 2017/0177497 A1* | 6/2017 | Chun | G06F 12/1009 |
| 2021/0064293 A1* | 3/2021 | Cho | G06F 3/0604 |
| 2021/0240633 A1* | 8/2021 | Manganelli | G06F 12/0897 |

* cited by examiner

*Primary Examiner* — Jane Wei
(74) *Attorney, Agent, or Firm* — Winston Hsu

(57) ABSTRACT

A method and associated apparatus for performing access management of a memory device with aid of dedicated bit information are provided. The method includes: transmitting a compact hybrid table comprising multiple compressed tables to a host device, for being stored in the host device, to allow the host device to send one of multiple compact hybrid table entries of the compact hybrid table to the memory device as reading reference; determining a starting logical address and a data length according to a read command packet from the host device, and determining a first mapping relationship and the dedicated bit information according to the read command packet; determining second mapping relationship(s) according to the first mapping relationship and the dedicated bit information; and reading the data from the NV memory for the host device at least according to the first mapping relationship and the second mapping relationship(s).

23 Claims, 7 Drawing Sheets

| Byte \ Bit | 7 | 6 | 5 | 4 | 3 | 2 | 1 | 0 |
|---|---|---|---|---|---|---|---|---|
| 0 | \multicolumn{8}{c}{Operation Code (F8h)} |
| 1 | | | | | | | | |
| 2 | (MSB) | | | | | | | |
| ⋮ | \multicolumn{8}{c}{Logical Block Address} |
| 5 | | | | | | | | (LSB) |
| 6 | (MSB) | | | | | | | |
| ⋮ | \multicolumn{8}{c}{Compact Hybrid Table Entry} |
| 13 | | | | | | | | (LSB) |
| 14 | \multicolumn{8}{c}{Transfer Length} |
| 15 | \multicolumn{8}{c}{Control = 00h} |

Bytes 6–13: CHTE

FIG. 11

METHOD AND APPARATUS FOR PERFORMING ACCESS MANAGEMENT OF A MEMORY DEVICE WITH AID OF DEDICATED BIT INFORMATION

CROSS REFERENCE TO RELATED APPLICATIONS

This application claims the benefit of U.S. Provisional Application No. 63/020,025, which was filed on May 5, 2020, and is included herein by reference.

BACKGROUND OF THE INVENTION

1. Field of the Invention

The present invention is related to memory control, and more particularly, to a method for performing access management of a memory device with aid of dedicated bit information, and an associated apparatus (e.g. a memory controller within the memory device, the memory device, and an electronic device comprising the memory device).

2. Description of the Prior Art

A memory device may comprise Flash memory for storing data, and the management of accessing the Flash memory is complicated. The memory device may comprise a RAM for purposes of buffering, management, etc. The storage capacity of the RAM is typically insufficient. The related art tries to correct the problem, but further problems are introduced. Thus, a novel method and associated architecture are needed for solving the problems without introducing any side effect or in a way that is less likely to introduce a side effect.

SUMMARY OF THE INVENTION

It is therefore an objective of the present invention to provide a method for performing access management of a memory device with aid of dedicated bit information, and to provide an associated apparatus (e.g. a memory controller within the memory device, the memory device, and an electronic device comprising the memory device), in order to solve the above-mentioned problems.

At least one embodiment of the present invention provides a method for performing access management of a memory device with aid of dedicated bit information, where the method is applicable to the memory device. The memory device may comprise a non-volatile (NV) memory, and the NV memory may comprise at least one NV memory element (e.g. one or more NV memory elements). The method may comprise: transmitting a compact hybrid table comprising multiple compressed tables to a host device, for being stored in the host device, to allow the host device to send one of multiple compact hybrid table entries of the compact hybrid table to the memory device to be reading reference, for enhancing reading performance (e.g. increasing reading speed) of the memory device, wherein the multiple compact hybrid table entries of the compact hybrid table have a same size; in response to the host device sending at least one packet for indicating at least one request, determining whether a reading request among the at least one request exists, wherein a read command packet carrying at least a starting logical address and a data length of the reading request among the at least one packet indicates the reading request; in response to existence of the reading request, obtaining reading reference information from the read command packet, wherein the reading reference information carried by the read command packet comprises first mapping information indicating a first mapping relationship and comprises the dedicated bit information, and the reading reference information represents a corresponding compact hybrid table entry of the multiple compact hybrid table entries of the compact hybrid table; determining at least one second mapping relationship according to the first mapping relationship and the dedicated bit information, for reading data of the data length that starts from the starting logical address; and reading the data from the NV memory for the host device at least according to the first mapping relationship and the at least one second mapping relationship.

In addition to the above method, the present invention also provides a memory device, and the memory device comprises a NV memory and a controller such as a memory controller. The NV memory is arranged to store information, wherein the NV memory may comprise at least one NV memory element (e.g. one or more NV memory elements). The controller is coupled to the NV memory, and the controller is arranged to control operations of the memory device. In addition, the controller comprises a processing circuit that is arranged to control the controller according to a plurality of host commands from a host device, to allow the host device to access the NV memory through the controller. For example, the controller transmits a compact hybrid table comprising multiple compressed tables to the host device, for being stored in the host device, to allow the host device to send one of multiple compact hybrid table entries of the compact hybrid table to the memory device to be reading reference, for enhancing reading performance (e.g. increasing reading speed) of the memory device, wherein the multiple compact hybrid table entries of the compact hybrid table have a same size; in response to the host device sending at least one packet for indicating at least one request, the controller determines whether a reading request among the at least one request exists, wherein a read command packet carrying at least a starting logical address and a data length of the reading request among the at least one packet indicates the reading request; in response to existence of the reading request, the controller obtains reading reference information from the read command packet, wherein the reading reference information carried by the read command packet comprises first mapping information indicating a first mapping relationship and comprises the dedicated bit information, and the reading reference information represents a corresponding compact hybrid table entry of the multiple compact hybrid table entries of the compact hybrid table; the controller determines at least one second mapping relationship according to the first mapping relationship and the dedicated bit information, for reading data of the data length that starts from the starting logical address; and the controller reads the data from the NV memory for the host device at least according to the first mapping relationship and the at least one second mapping relationship.

According to some embodiments, an associated electronic device is also provided. The electronic device may comprise the above memory device, and may further comprise: the host device, coupled to the memory device. The host device may comprise: at least one processor, arranged for controlling operations of the host device; and a power supply circuit, coupled to the at least one processor, arranged for providing power to the at least one processor and the memory device. In addition, the memory device can be configured to provide the host device with storage space.

In addition to the above method, the present invention also provides a controller of a memory device, such as a memory controller within the memory device, where the memory device comprises the controller and a NV memory. The NV memory may comprise at least one NV memory element (e.g. one or more NV memory elements). In addition, the controller comprises a processing circuit that is arranged to control the controller according to a plurality of host commands from a host device, to allow the host device to access the NV memory through the controller. For example, the controller transmits a compact hybrid table comprising multiple compressed tables to the host device, for being stored in the host device, to allow the host device to send one of multiple compact hybrid table entries of the compact hybrid table to the memory device to be reading reference, for enhancing reading performance (e.g. increasing reading speed) of the memory device, wherein the multiple compact hybrid table entries of the compact hybrid table have a same size; in response to the host device sending at least one packet for indicating at least one request, the controller determines whether a reading request among the at least one request exists, wherein a read command packet carrying at least a starting logical address and a data length of the reading request among the at least one packet indicates the reading request; in response to existence of the reading request, the controller obtains reading reference information from the read command packet, wherein the reading reference information carried by the read command packet comprises first mapping information indicating a first mapping relationship and comprises the dedicated bit information, and the reading reference information represents a corresponding compact hybrid table entry of the multiple compact hybrid table entries of the compact hybrid table; the controller determines at least one second mapping relationship according to the first mapping relationship and the dedicated bit information, for reading data of the data length that starts from the starting logical address; and the controller reads the data from the NV memory for the host device at least according to the first mapping relationship and the at least one second mapping relationship.

At least one embodiment of the present invention provides a method for performing access management of a memory device with aid of dedicated bit information, where the method is applicable to a host device. The memory device may comprise a non-volatile (NV) memory, and the NV memory may comprise at least one NV memory element (e.g. one or more NV memory elements). The method may comprise: receiving a compact hybrid table comprising multiple compressed tables from the memory device, and storing the compact hybrid table in the host device, for sending one of multiple compact hybrid table entries of the compact hybrid table to the memory device to be reading reference, for enhancing reading performance of the memory device, wherein the multiple compact hybrid table entries of the compact hybrid table have a same size; in response to at least one request from a user of the host device being received, determining whether a reading request among the at least one request exists; in response to existence of the reading request, sending a read command packet carrying at least a starting logical address and a data length of the reading request to the memory device, and providing reading reference information to the memory device through the read command packet, wherein the read command packet indicates the reading request, the reading reference information carried by the read command packet comprises first mapping information indicating a first mapping relationship and comprises the dedicated bit information, and the reading reference information represents a corresponding compact hybrid table entry of the multiple compact hybrid table entries of the compact hybrid table; utilizing a memory controller within the memory device to determine at least one second mapping relationship according to the first mapping relationship and the dedicated bit information, for reading data of the data length that starts from the starting logical address; and utilizing the memory controller to read the data from the NV memory for the host device at least according to the first mapping relationship and the at least one second mapping relationship.

In addition to the above method, the present invention also provides a host device, where the host device is applicable to performing access management of a memory device with aid of dedicated bit information. The memory device may comprise a non-volatile (NV) memory, and the NV memory comprising at least one NV memory element (e.g. one or more NV memory elements). The host device may comprise: at least one processor, arranged for controlling operations of the host device; at least one random access memory (RAM), coupled to the at least one processor, arrange for storing information within the host device; and a power supply circuit, coupled to the at least one processor, arranged for providing power to the at least one processor and the memory device. For example, the host device is configured to receive a compact hybrid table comprising multiple compressed tables from the memory device, and to store the compact hybrid table in the at least one RAM of the host device, for sending one of multiple compact hybrid table entries of the compact hybrid table to the memory device to be reading reference, for enhancing reading performance of the memory device, wherein the multiple compact hybrid table entries of the compact hybrid table have a same size; in response to at least one request from a user of the host device being received, the host device is configured to determine whether a reading request among the at least one request exists; in response to existence of the reading request, the host device is configured to send a read command packet carrying at least a starting logical address and a data length of the reading request to the memory device, and to provide reading reference information to the memory device through the read command packet, wherein the read command packet indicates the reading request, the reading reference information carried by the read command packet comprises first mapping information indicating a first mapping relationship and comprises the dedicated bit information, and the reading reference information represents a corresponding compact hybrid table entry of the multiple compact hybrid table entries of the compact hybrid table; the host device utilizes a memory controller within the memory device to determine at least one second mapping relationship according to the first mapping relationship and the dedicated bit information, for reading data of the data length that starts from the starting logical address; and the host device utilizes the memory controller to read the data from the NV memory for the host device at least according to the first mapping relationship and the at least one second mapping relationship.

According to some embodiments, the apparatus may comprise at least one portion (e.g. a portion or all) of the electronic device. For example, the apparatus may comprise the memory controller within the memory device. In another example, the apparatus may comprise the memory device. In some examples, the apparatus may comprise the electronic device or the host device within the electronic device. In addition, the memory controller can be configured to control operations of the memory device according to the method, and the NV memory (e.g. a Flash memory) comprising the at least one NV memory element (e.g. one or more Flash memory dies, or one or more Flash memory chip) can be configured to store data. Examples of the memory device may include, but are not limited to: a memory card, a solid state drive, etc. Examples of the host device may include, but are not limited to: a multifunctional mobile phone, a tablet, a personal computer such as a laptop computer and a desktop computer. Additionally, the memory device can be configured to store data for the host device. The memory device can be configured to read the stored data in response to a host command from the host device, and provide the host device with the data read from the NV memory. In order to enhance the performance of the memory device, the host device can be configured to obtain some internal information of the memory device. The host device can be configured to send back the internal information previously obtained from the memory device toward the memory device, to allow the memory device to use the internal information, where the memory device can utilize and share the RAM of the host device. According to some embodiments, the host device and the memory device can adopt one or more better packet formats to optimize communications between the host device and the memory device. For example, the one or more better packet formats can be configured to carry dedicated bit information to indicate more than one physical address, to reduce the number of packets between the host device and the memory device.

The present invention method and apparatus can guarantee that the memory device can operate properly in various situations. For example, the internal information sent from the host device may be incorrect, and the present invention method and apparatus can detect this situation and prevent malfunction, etc. of the memory device. In addition, the information may be altered, and the present invention method and apparatus can detect this situation and prevent some security issues. Additionally, the present invention method and apparatus can provide the one or more better packet formats to optimize communications between the host device and the memory device, to make the whole system be suitable for operating according to one or more newer specifications (e.g. Host Performance Booster (HPB) 2.0 supposed to be promoted together with Universal Flash Storage (UFS) 3.1) and to improve the random read speed of the memory device.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 11 illustrates a command packet of the HPB READ command that carries a corresponding compact hybrid table entry in the control scheme shown in FIG. 4 according to an embodiment of the present invention.

DETAILED DESCRIPTION

Figure 1:
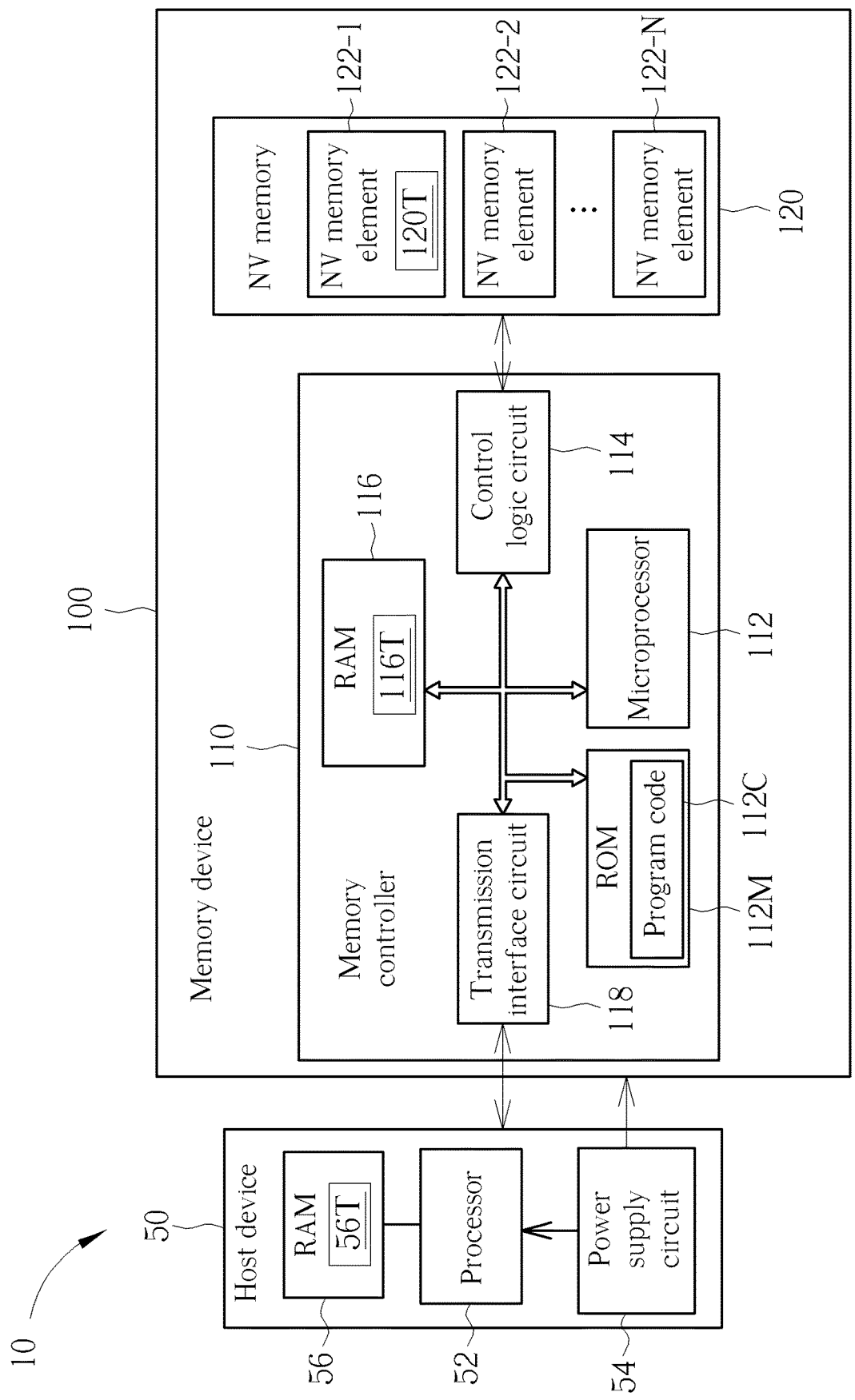
FIG. 1 is a diagram of an electronic device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g. one or more processors) which may be collectively referred to as the processor 52, a power supply circuit 54, and at least one random access memory (RAM) (e.g. one or more RAMs, such as a dynamic RAM (DRAM), a static RAM (SRAM), etc.) which may be collectively referred to as the RAM 56), where the processor 52 and the RAM 56 may be coupled to each other through a bus, and may be coupled to the power supply circuit 54 to obtain power. The processor 52 may be arranged to control operations of the host device 50, the power supply circuit 54 may be arranged to provide the processor 52, the RAM 56, and the memory device 100 with power, and output one or more driving voltages to the memory device 100, where the memory device 100 may provide the host device 50 with storage space, and may obtain the one or more driving voltages from the host device 50, to be the power of the memory device 100. Examples of the host device 50 may include, but are not limited to: a multifunctional mobile phone, a tablet computer, a wearable device, and a personal computer such as a desktop computer and a laptop computer. Examples of the memory device 100 may include, but are not limited to: a portable memory device (e.g. a memory card conforming to the SD/MMC, CF, MS or XD specification), a solid state drive (SSD), and various types of embedded memory devices (e.g. am embedded memory device conforming to the UFS or eMMC specification). According to this embodiment, the memory device 100 may comprise a controller such as a memory controller 110, and may further comprise a non-volatile (NV) memory 120, where the controller is arranged to access the NV memory 120, and the NV memory 120 is arranged to store information. The NV memory 120 may comprise at least one NV memory element (e.g. one or more NV memory elements), such as a plurality of NV memory elements 122-1, 122-2, . . . , and 122-N, where "N" may represent a positive integer that is greater than one. For example, the NV memory 120 may be a flash memory, and the plurality of NV memory elements 122-1, 122-2, . . . , and 122-N may be a plurality of flash memory chips or a plurality of flash memory dies, respectively, but the present invention is not limited thereto.

As shown in FIG. 1, the memory controller 110 may comprise a processing circuit such as a microprocessor 112, a storage unit such as a read only memory (ROM) 112M, a control logic circuit 114, a RAM 116 (which may be implemented by way of SRAM, for example), and a transmission interface circuit 118, where at least one portion (e.g. a portion or all) of the above components may be coupled to one another via a bus. The RAM 116 may be arranged to provide the memory controller 110 with internal storage space (for example, may temporarily store information), but the present invention is not limited thereto. In addition, the ROM 112M of this embodiment is arranged to store a program code 112C, and the microprocessor 112 is arranged to execute the program code 112C to control the access of the NV memory 120. Please note that, the program code 112C may also be stored in the RAM 116 or any type of memory. Additionally, the control logic circuit 114 may be arranged to control the NV memory 120. The control logic circuit 114 may comprise an error correction code (ECC) circuit (not shown in FIG. 1), which may perform ECC encoding and ECC decoding, to protect data, and/or perform error correction, and the transmission interface circuit 118 may conform to a specific communications specification (e.g. the Serial Advanced Technology Attachment (SATA) specification, Universal Serial Bus (USB) specification, Peripheral Component Interconnect Express (PCIE) specification, embedded Multi Media Card (eMMC) specification, or Universal Flash Storage (UFS) specification), and may perform communications according to the specific communications specification.

In this embodiment, the host device 50 may transmit a plurality of host commands and corresponding logical addresses to the memory controller 110, to access the NV memory 120 within the memory device 100, indirectly. The memory controller 110 receives the plurality of host commands and the logical addresses, and translates the plurality of host commands into memory operating commands (which may be referred to as operating commands, for brevity), respectively, and further controls the NV memory 120 with the operating commands to perform reading or writing/ programing upon the memory units or data pages of specific physical addresses within the NV memory 120, where the physical addresses correspond to the logical addresses. For example, the memory controller 110 may generate or update at least one logical-to-physical (H2F) address mapping table to manage the mapping relationships between the physical addresses and the logical addresses. The NV memory 120 can be configured to store the at least one H2F address mapping table such as a global H2F address mapping table 120T, for the memory controller 110 to control the memory device 100 to access data in the NV memory 120.

For better comprehension, the global H2F address mapping table 120T may be located in a predetermined region within the NV memory element 122-1, such as a system region, but the present invention is not limited thereto. For example, the global H2F address mapping table 120T may be divided into a plurality of local H2F address mapping tables, and the local H2F address mapping tables may be stored in one or more of the NV memory elements 122-1, 122-2, ..., and 122-N, and more particularly, may be stored in the NV memory elements 122-1, 122-2, ..., and 122-N, respectively. When needed, the memory controller 110 may load at least one portion (e.g. a portion or all) of the global H2F address mapping table 120T into the RAM 116 or other memories. For example, the memory controller 110 may load a local H2F address mapping table of the plurality of local H2F address mapping tables into the RAM 116 to be a temporary H2F address mapping table 116T therein, for accessing data in the NV memory 120 according to local H2F address mapping table, but the present invention is not limited thereto.

In addition, the aforementioned at least one NV memory element (e.g. the one or more NV memory elements such as {122-1, 122-2, ..., 122-N}) may comprise a plurality of blocks, where the minimum unit that the memory controller 110 may perform operations of erasing data on the NV memory 120 may be a block, and the minimum unit that the memory controller 110 may perform operations of writing data on the NV memory 120 may be a page, but the present invention is not limited thereto. For example, any NV memory element 122-n (where "n" may represent any integer in the interval [1, N]) within the NV memory elements 122-1, 122-2, ..., and 122-N, may comprise multiple blocks, and a block within the multiple blocks may comprise and record specific number of pages, where the memory controller 110 may access a certain page of a certain block within the multiple blocks according to a block address and a page address. For another example, the NV memory element 122-n may comprise multiple planes, where a plane may comprise a set of blocks such as the aforementioned multiple blocks, and the memory controller 110 may specify a certain plane within the multiple planes according to a plane number, to access a certain page of a certain block of this plane. As the total number of blocks increases, the storage space of the NV memory 120 may become larger. Regarding manufacturing the NV memory 120, many technologies may be utilized, for example: a 2D/planar NAND flash technology, which may arrange memory cells into a single layer; and a 3D NAND flash technology, which may arrange the memory cells into a vertical stack of multiple layers. According to some embodiments, the NV memory 120 may be implemented as a 2D/planar NAND flash structure with the memory cells arranged in a single layer. According to some embodiments, the NV memory 120 may be implemented as a 3D NAND flash structure with multiple layers of memory cells stacked vertically. In this situation, the storage space of the NV memory 120 may become very large.

According to some embodiments, the memory controller 110 may transmit a local H2F address mapping table of the plurality of local H2F address mapping tables and corresponding protection information of this local H2F address mapping table (e.g. a physical address of this local H2F address mapping table, such as the latest physical address indicating the latest location where this local H2F address mapping table is stored in the NV memory 120) to the host device 50, for being temporarily stored in the RAM 56 as a host-side table such as a hybrid table 56T (e.g. under control of the processor 52), in order to save the storage space of the RAM 116. In this situation, when accessing data in the memory device 100, the host device 50 may send one or more hybrid table entries of the hybrid table 56T to the memory controller 110, and the memory controller 110 may access the data according to the one or more hybrid table entries for the host device 50, where any hybrid table entry of the one or more hybrid table entries may comprise a physical address and the protection information thereof. If the protection information indicates that this physical address (more particularly, the whole of the hybrid table 56T) is incorrect, the memory controller 110 can be configured to read the data for returning the data to the host device 50 (e.g., the memory controller 110 may load the local H2F address mapping table from the NV memory 120 into the RAM 116 according to the latest physical address of the local H2F address mapping table, to be the temporary H2F address mapping table 116T, and read the data from the NV memory 120 according to the temporary H2F address mapping table 116T in the RAM 116) and/or suggest the host device 50 to update the host-side table such as the hybrid table 56T (e.g., the host device 50 may request the memory device 100 to provide the latest version of the local H2F address mapping table, and update the host-side table such as the hybrid table 56T with the latest version of the local H2F address mapping table). For example, the memory controller 110 may maintain a latest-table-address table in the RAM 116, and the latest-table-address table may comprise respective latest table addresses of the plurality of local H2F address mapping tables. When the physical address of this local H2F address mapping table does not match the latest physical address of this local H2F address mapping table, the memory controller 110 may determine that this physical address (more particularly, the whole of the hybrid table 56T) is incorrect. Regarding suggesting the host device 50 to update the host-side table such as the hybrid table 56T, the memory controller 110 may utilize a RESPONSE UFS Protocol Information Unit (UPIU) to notify the host device 50 of this suggestion. For example, the memory controller 110 may set Bit 1 (e.g. HPB_UPDATE_ALERT) of a Device Information field of the RESPONSE UPIU to be 1, and set at least one portion (e.g. a portion or all) of Bytes [K+8:K+11] and [K+12:K+15] in a HPB Sense Data region of the RESPONSE UPIU to carry associated information.

Figure 2:
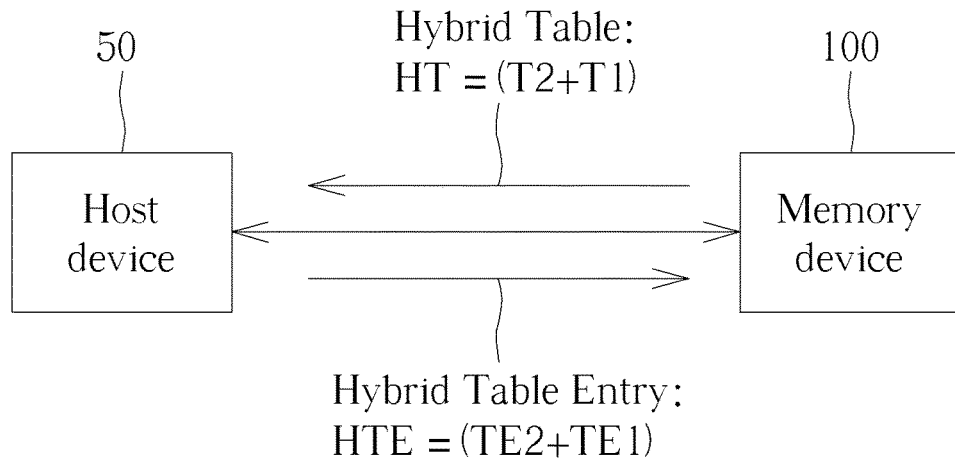
FIG. 2 illustrates a control scheme of a method for performing access management of a memory device such as that shown in FIG. 1 according to an embodiment of the present invention.

FIG. 2 illustrates a control scheme of a method for performing access management of a memory device such as that shown in FIG. 1 according to an embodiment of the present invention. The memory controller 110 may transmit a combination of multiple tables, such as a hybrid table HT comprising two tables T1 and T2, to the host device 50 to be the hybrid table 56T (labeled "HT=(T2+T1)" for brevity), where the two tables T1 and T2 may represent the local H2F address mapping table and a protection information table comprising the corresponding protection information of this local H2F address mapping table, respectively. For example, the hybrid table HT may comprise multiple hybrid table entries {HTE} respectively corresponding to a series of logical addresses and may be configured for mapping the series of logical addresses to associated physical addresses recorded in the multiple hybrid table entries {HTE}, respectively. Any hybrid table entry HTE of the multiple hybrid table entries {HTE} of the hybrid table HT (e.g. each hybrid table entry thereof) may comprise a table entry TE1 of the table T1 (e.g. a physical address of the associated physical addresses recorded in the multiple hybrid table entries {HTE}) and a table entry TE2 of the table T2 (e.g. the protection information of this local H2F address mapping table, such as the physical address of this local H2F address mapping table, for checking whether this local H2F address mapping table is correct or checking whether this physical address is correct when the hybrid table entry HTE is sent back from the host device 50 to the memory device 100).

When reading one or more sets of data from the memory device 100, the host device 50 may send at least one packet for indicating the reading request (e.g. a read command packet carrying a read command, a starting logical address, and a data length) to the memory controller 110, and more particularly, may send a Host Performance Booster (HPB) entry packet carrying a corresponding hybrid table entry HTE of the multiple hybrid table entries {HTE} to the memory controller 110, where the corresponding hybrid table entry HTE may comprise a table entry TE1 such as an associated physical address corresponding to the starting logical address and comprise a table entry TE2 such as the protection information of this local H2F address mapping table (labeled "HTE=(TE2+TE1)" for brevity). For example, the aforementioned at least one packet may comprise the HPB entry packet, and may be implemented by way of a HPB READ command, and the HPB READ command may comprise an operation code, a logical block address (LBA) indicating the starting logical address, an HPB entry indicating the corresponding hybrid table entry HTE, a transfer length indicating the data length, etc. According to the table entry TE2 such as the protection information of this local H2F address mapping table, the memory controller 110 may determine whether the table T1 such as this local H2F address mapping table (e.g. the table entry TE1 such as the associated physical address corresponding to the starting logical address) is correct. For example, when the protection information in the table entry TE2, such as the physical address of this local H2F address mapping table, matches the latest physical address of this local H2F address mapping table, the memory controller 110 may determine that this local H2F address mapping table (e.g. this physical address) is correct, and may further access the one or more sets of data in the NV memory 120 according to the table entry TE1 such as the associated physical address corresponding to the starting logical address for the host device 50.

Figure 3:
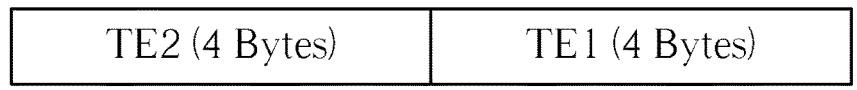
FIG. 3 illustrates an example of a Host Performance Booster (HPB) entry format of the control scheme shown in FIG. 2.

FIG. 3 illustrates an example of a Host Performance Booster (HPB) entry format of the control scheme shown in FIG. 2, where this HPB entry format is suitable for a HPB architecture conforming to HPB 1.0 specification. According to the HPB entry format shown in FIG. 3, in the aforementioned any hybrid table entry HTE of the multiple hybrid table entries {HTE} of the hybrid table HT, the table entry TE1 may have 4 bytes, and the table entry TE2 may also have 4 bytes.

TABLE 1

| HPB entry | T2 Content | T1 Content |
| --- | --- | --- |
| 0 | 0x00004030 | 0x0000A000 |
| 1 | 0x00004030 | 0x0000A001 |
| 2 | 0x00004030 | 0x0000A002 |
| 3 | 0x00004030 | 0x0000A003 |
| 4 | 0x00004030 | 0x0000A004 |
| 5 | 0x00004030 | 0x0000A005 |
| 6 | 0x00004030 | 0x0000B009 |
| 7 | 0x00004030 | 0x0000A007 |
| 8 | 0x00004030 | 0x0000A008 |
| 9 | 0x00004030 | 0x0000A009 |
| 10 | 0x00004030 | 0x0000A00A |
| 11 | 0x00004030 | 0x0000B00A |
| 12 | 0x00004030 | 0x0000A00C |
| . . . | . . . | . . . |

Table 1 illustrates an example of the hybrid table HT, where the notation " . . . " indicates that some table contents may be omitted for brevity. The HPB entries {0, 1, . . . } of Table 1 may represent the multiple hybrid table entries {HTE}. In addition, the T1 and T2 contents (e.g. hexadecimal values) of Table 1 may represent the contents of the tables T1 and T2 (e.g. respective table entries {TE1} and {TE2} of the tables T1 and T2), respectively. The physical addresses {0x0000A000, 0x0000A001,} that appear in the T1 contents may be taken as examples of the associated physical addresses corresponding to the series of logical addresses, and the physical address 0x00004030 that repeatedly appears to be the physical addresses {0x00004030, 0x00004030,} in the T2 contents may be taken as an example of the physical address of the local H2F address mapping table.

Figure 4:
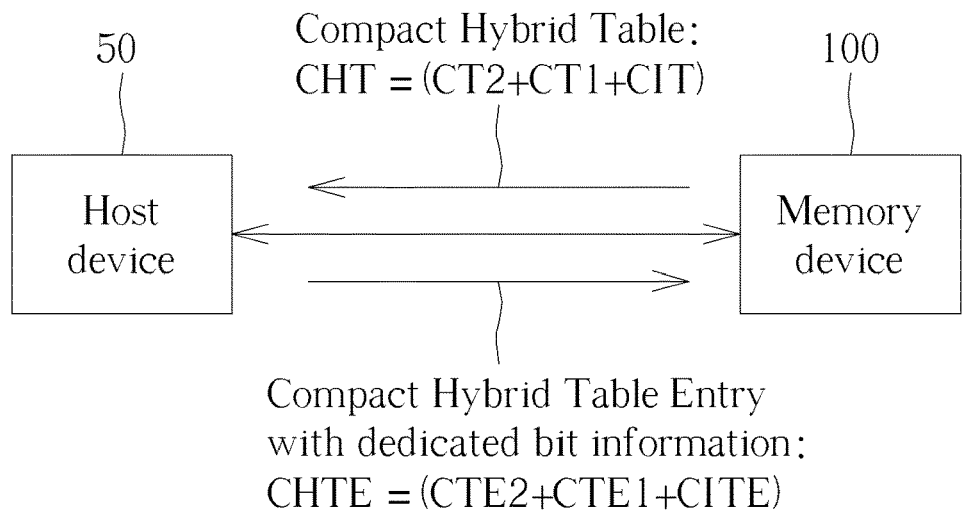
FIG. 4 illustrates a control scheme of a method for performing access management of a memory device such as that shown in FIG. 1 with aid of dedicated bit information according to an embodiment of the present invention.

FIG. 4 illustrates a control scheme of a method for performing access management of a memory device such as that shown in FIG. 1 with aid of dedicated bit information according to an embodiment of the present invention. The memory controller 110 may transmit a combination of multiple tables, such as a compact hybrid table CHT comprising two compressed tables CT1 and CT2 (e.g. respective compressed versions of the tables T1 and T2) and comprising a continuity information table CIT, to the host device 50 to be the hybrid table 56T (labeled "CHT=(CT2+CT1+CIT)" for brevity), where the two compressed tables CT1 and CT2 may represent the local H2F address mapping table and a protection information table comprising the corresponding protection information of this local H2F address mapping table, respectively. For example, the compact hybrid table CHT may comprise multiple compact hybrid table entries {CHTE} respectively corresponding to a series of logical addresses and may be configured for mapping the series of logical addresses to associated physical addresses recorded in the multiple compact hybrid table entries {CHTE}, respectively. Any compact hybrid table entry CHTE of the multiple compact hybrid table entries {CHTE} of the compact hybrid table CHT (e.g. each compact hybrid table entry thereof) may comprise a compressed table entry CTE1 of the compressed table CT1 (e.g. a physical address of the associated physical addresses recorded in the multiple compact hybrid table entries {CHTE}) and a compressed table entry CTE2 of the compressed table CT2 (e.g. the protection information of this local H2F address mapping table, such as the physical address of this local H2F address mapping table, for checking whether this local H2F address mapping table is correct or checking whether this physical address is correct when the compact hybrid table entry CHTE is sent back from the host device 50 to the memory device 100), and may comprise a continuity information table entry CITE of the continuity information table CIT, such as dedicated bit information DBI for indicating continuity of a set of physical addresses starting from this physical address (e.g. a portion or all of the associated physical addresses recorded in the multiple compact hybrid table entries {CHTE}) among the associated physical addresses recorded in the multiple compact hybrid table entries {CHTE}.

When reading one or more sets of data from the memory device 100, the host device 50 may send at least one packet for indicating the reading request (e.g. a read command packet carrying a read command, a starting logical address, and a data length) to the memory controller 110, and more particularly, may send an HPB entry packet carrying a corresponding compact hybrid table entry CHTE of the multiple compact hybrid table entries {CHTE} to the memory controller 110, where the corresponding compact hybrid table entry CHTE may comprise a compressed table entry CTE1 such as an associated physical address corresponding to the starting logical address, a compressed table entry CTE2 such as the protection information of this local H2F address mapping table, and a continuity information table entry CITE such as the dedicated bit information DBI for indicating continuity of a set of physical addresses starting from this physical address (labeled "CHTE=(CTE2+CTE1+CITE)" for brevity). For example, the aforementioned at least one packet may comprise the HPB entry packet, and may be implemented by way of the HPB READ command, and the HPB READ command may comprise the operation code, an LBA indicating the starting logical address, an HPB entry indicating the corresponding compact hybrid table entry CHTE, a transfer length indicating the data length, etc. According to the compressed table entry CTE2 such as the protection information of this local H2F address mapping table, the memory controller 110 may determine whether the compressed table CT1 such as this local H2F address mapping table (e.g. the compressed table entry CTE1 such as the associated physical address corresponding to the starting logical address) is correct. For example, when the protection information in the compressed table entry CTE2, such as the physical address of this local H2F address mapping table, matches the latest physical address of this local H2F address mapping table, the memory controller 110 may determine that this local H2F address mapping table (e.g. this physical address) is correct, and may further access the one or more sets of data in the NV memory 120 at least according to the compressed table entry CTE1 such as the associated physical address corresponding to the starting logical address for the host device 50.

More particularly, in a situation where a data amount of the one or more sets of data reaches a predetermined data amount (e.g. the data amount of the one or more sets of data is greater than the data amount corresponding to a logical block address (LBA), such as the data amount of a logical block), when determining that this local H2F address mapping table (e.g. this physical address) is correct, the memory controller 110 may access the one or more sets of data in the NV memory 120 according to the compressed table entry CTE1 such as the associated physical address corresponding to the starting logical address and according to the continuity information table entry CITE such as the dedicated bit information DBI for the host device 50, where the memory controller 110 may obtain all physical addresses that are need in this reading operation of the one or more sets of data from the compressed table entry CTE1 and the continuity information table entry CITE, having no need to load one or more additional local H2F address mapping tables of the plurality of local H2F address mapping tables from the NV memory 120.

Although the number of bytes of the HPB entry packet may be limited to 8 bytes and the HPB entry packet count per reading request may be limited to one, the memory controller 110 can access the one or more sets of data reaching the predetermined data amount with ease, and can prevent loading the one or more additional local H2F address mapping tables (e.g. one or more local H2F address mapping tables having the H2F mapping information that are needed). For example, by adopting one or more better packet formats carrying the dedicated bit information DBI, the present invention method and apparatus can optimize communications between the host device 50 and the memory device 100, to make the whole system (e.g. the electronic device 10) be suitable for operating according to one or more newer specifications (e.g. a newer version of HPB specification, such as HPB 2.0 specification supposed to be promoted together with Universal Flash Storage (UFS) 3.1 specification) and to improve the random read speed of the memory device 100.

According to some embodiments, the two compressed tables CT1 and CT2 may represent at least one local H2F address mapping table (e.g. one or more local H2F address mapping tables of the plurality of local H2F address mapping tables, such as the local H2F address mapping table mentioned in one or more of the above embodiments) and a protection information table comprising the corresponding protection information of the aforementioned at least one local H2F address mapping table, respectively.

Figure 5:
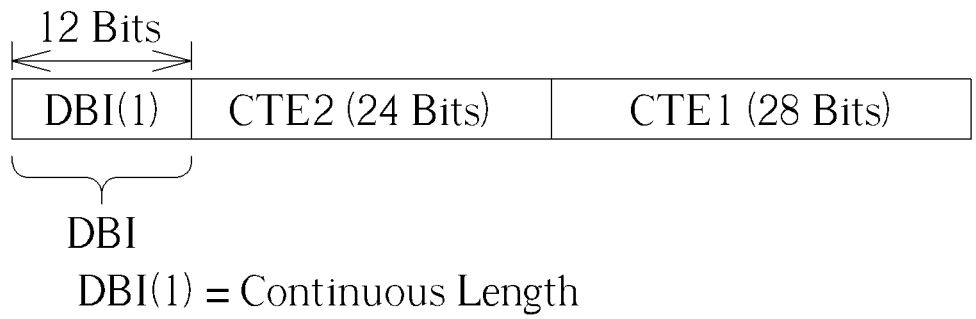
FIG. 5 illustrates a HPB entry format of the control scheme shown in FIG. 4 according to an embodiment of the present invention.

FIG. 5 illustrates a HPB entry format of the control scheme shown in FIG. 4 according to an embodiment of the present invention, where this HPB entry format is suitable for a HPB architecture conforming to the one or more newer specifications. According to the HPB entry format shown in FIG. 5, in the aforementioned any compact hybrid table entry CHTE of the multiple compact hybrid table entries {CHTE} of the compact hybrid table CHT, the compressed table entry CTE1 may have 28 bits, the compressed table entry CTE2 may have 24 bits, and the continuity information table entry CITE such as the dedicated bit information DBI may have 12 bits. For example, the continuity information table entry CITE such as the dedicated bit information DBI may comprise dedicated bit information DBI(1), where the dedicated bit information DBI(1) may represent a continuous length.

TABLE 2

| HPB entry | Continuous Length | CT2 Content | CT1 Content |
|---|---|---|---|
| 0 | 0x5 | 0x004030 | 0x000A000 |
| 1 | 0x4 | 0x004030 | 0x000A001 |
| 2 | 0x3 | 0x004030 | 0x000A002 |
| 3 | 0x2 | 0x004030 | 0x000A003 |
| 4 | 0x1 | 0x004030 | 0x000A004 |
| 5 | 0x0 | 0x004030 | 0x000A005 |
| 6 | 0x0 | 0x004030 | 0x000B009 |
| 7 | 0x3 | 0x004030 | 0x000A007 |
| 8 | 0x2 | 0x004030 | 0x000A008 |
| 9 | 0x1 | 0x004030 | 0x000A009 |
| 10 | 0x0 | 0x004030 | 0x000A00A |
| 11 | 0x0 | 0x004030 | 0x000B00A |
| 12 | . . . | 0x004030 | 0x000A00C |
| . . . | . . . | . . . | . . . |

Table 2 illustrates an example of the compact hybrid table CHT, where the notation " . . . " indicates that some table contents may be omitted for brevity. The HPB entries {0, 1, . . . } of Table 2 may represent the multiple compact hybrid table entries {CHTE}. In addition, the CT1 and CT2 contents (e.g. hexadecimal values) of Table 2 may represent the contents of the compressed tables CT1 and CT2 (e.g. the respective compressed table entries {CTE1} and {CTE2} of the compressed tables CT1 and CT2), respectively. The physical addresses {0x000A000, 0x000A001, . . . , 0x000A005, 0x000B009, 0x000A007, . . . , 0x000A00A, 0x000B00A, 0x000A00C, . . . } that appear in the CT1 contents may be taken as examples of the associated physical addresses corresponding to the series of logical addresses, and the physical address 0x004030 that repeatedly appears to be the physical addresses {0x004030, 0x004030, . . . } in the CT2 contents may be taken as an example of the physical address of the local H2F address mapping table.

Before sending the compact hybrid table CHT to the host device 50, regarding the aforementioned any compact hybrid table entry CHTE of the multiple compact hybrid table entries {CHTE} of the compact hybrid table CHT, the memory controller 110 may calculate and generate (e.g. record and/or update) the number of continuous physical addresses coming after the physical address of this compact hybrid table entry CHTE among the associated physical addresses in the compressed table CT1, to be the continuous length. For example, regarding the HPB entry 0, the memory controller 110 may calculate and generate (e.g. record and/or update) the number of the continuous physical addresses {0x000A001, 0x000A005} coming after the physical address 0x000A000 among the physical addresses {0x000A000, 0x000A001, . . . , 0x000A005, 0x000B009, 0x000A007, . . . , 0x000A00A, 0x000B00A, 0x000A00C, . . . }, to be the continuous length of the HPB entry 0, such as 0x5; regarding the HPB entry 1, the memory controller 110 may calculate and generate (e.g. record and/or update) the number of the continuous physical addresses {0x000A002, . . . , 0x000A005} coming after the physical address 0x000A001 among the physical addresses {0x000A000, 0x000A001, . . . , 0x000A005, 0x000B009, 0x000A007, . . . , 0x000A00A, 0x000B00A, 0x000A00C, . . . }, to be the continuous length of the HPB entry 1, such as 0x4; and the rest may be deduced by analogy. As a result, the memory controller 110 may transmit the compact hybrid table CHT from the memory device 100 to the host device 50.

After the transmission of the compact hybrid table CHT from the memory device 100 to the host device 50 and the transmission of the corresponding compact hybrid table entry CHTE from the host device 50 to the memory device 100, the memory controller 110 may access the one or more sets of data in the NV memory 120 according to the compressed table entry CTE1 such as the associated physical address corresponding to the starting logical address (e.g. the physical address 0x000A000 of the HPB entry 0) and according to the continuity information table entry CITE such as the dedicated bit information DBI (e.g. the continuous length of the HPB entry 0, such as 0x5) for the host device 50, where the memory controller 110 may obtain all physical addresses (e.g. the physical addresses {0x000A000, 0x000A001, . . . , 0x000A005}) that are need in this reading operation of the one or more sets of data from the compressed table entry CTE1 and the continuity information table entry CITE, having no need to load the one or more additional local H2F address mapping tables of the plurality of local H2F address mapping tables from the NV memory 120.

Figure 6:
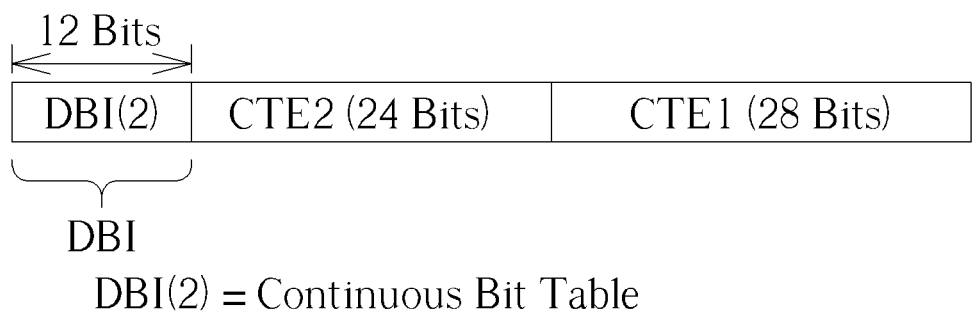
FIG. 6 illustrates a HPB entry format of the control scheme shown in FIG. 4 according to another embodiment of the present invention.

FIG. 6 illustrates a HPB entry format of the control scheme shown in FIG. 4 according to another embodiment of the present invention, where this HPB entry format is suitable for a HPB architecture conforming to the one or more newer specifications. According to the HPB entry format shown in FIG. 6, in the aforementioned any compact hybrid table entry CHTE of the multiple compact hybrid table entries {CHTE} of the compact hybrid table CHT, the compressed table entry CTE1 may have 28 bits, the compressed table entry CTE2 may have 24 bits, and the continuity information table entry CITE such as the dedicated bit information DBI may have 12 bits. For example, the continuity information table entry CITE such as the dedicated bit information DBI may comprise dedicated bit information DBI(2), where the dedicated bit information DBI(2) may represent a continuous bit table.

TABLE 3

| HPB entry | Continuous Bit Table | CT2 Content | CT1 Content |
|---|---|---|---|
| 0 | 0xBDF (101111011111) | 0x004030 | 0x000A000 |
| 1 | 0xDEF (110111101111) | 0x004030 | 0x000A001 |
| 2 | 0xEF7 (111011110111) | 0x004030 | 0x000A002 |
| 3 | 0xF7B (111101111011) | 0x004030 | 0x000A003 |
| 4 | . . . | 0x004030 | 0x000A004 |
| 5 | . . . | 0x004030 | 0x000A005 |
| 6 | . . . | 0x004030 | 0x000B009 |

TABLE 3-continued

| HPB entry | Continuous Bit Table | CT2 Content | CT1 Content |
|---|---|---|---|
| 7 | ... | 0x004030 | 0x000A007 |
| 8 | ... | 0x004030 | 0x000A008 |
| 9 | ... | 0x004030 | 0x000A009 |
| 10 | ... | 0x004030 | 0x000A00A |
| 11 | ... | 0x004030 | 0x000B00A |
| 12 | ... | 0x004030 | 0x000A00C |
| 13 | ... | 0x004030 | 0x000A00D |
| 14 | ... | 0x004030 | 0x000A00E |
| 15 | ... | 0x004030 | 0x000A00F |
| ... | ... | ... | ... |

Table 3 illustrates an example of the compact hybrid table CHT, where the notation " . . . " indicates that some table contents may be omitted for brevity. The HPB entries {0, 1, . . . } of Table 3 may represent the multiple compact hybrid table entries {CHTE}. In addition, the CT1 and CT2 contents (e.g. hexadecimal values) of Table 3 may represent the contents of the compressed tables CT1 and CT2 (e.g. the respective compressed table entries {CTE1} and {CTE2} of the compressed tables CT1 and CT2), respectively. The physical addresses {0x000A000, 0x000A001, . . . , 0x000A005, 0x000B009, 0x000A007, . . . , 0x000A00A, 0x000B00A, 0x000A00C, 0x000A00D, 0x000A00E, 0x000A00F, . . . } that appear in the CT1 contents may be taken as examples of the associated physical addresses corresponding to the series of logical addresses, and the physical address 0x004030 that repeatedly appears to be the physical addresses {0x004030, 0x004030, . . . } in the CT2 contents may be taken as an example of the physical address of the local H2F address mapping table.

Before sending the compact hybrid table CHT to the host device 50, regarding the aforementioned any compact hybrid table entry CHTE of the multiple compact hybrid table entries {CHTE} of the compact hybrid table CHT, the memory controller 110 may check respectively continuity of multiple subsequent physical addresses coming after the physical address of this compact hybrid table entry CHTE among the associated physical addresses in the compressed table CT1, to generate the continuous bit table indicating the respectively continuity of the multiple subsequent physical addresses. For example, regarding the HPB entry 0, the memory controller 110 may check respectively continuity of 12 subsequent physical addresses {0x000A001, . . . , 0x000A005, 0x000B009, 0x000A007, . . . , 0x000A00A, 0x000B00A, 0x000A00C} coming after the physical address 0x000A000 among the associated physical addresses {0x000A000, 0x000A001, . . . , 0x000A005, 0x000B009, 0x000A007, . . . , 0x000A00A, 0x000B00A, 0x000A00C, 0x000A00D, 0x000A00E, 0x000A00F, . . . }, to generate the continuous bit table 0xBDF indicating the respectively continuity of the 12 subsequent physical addresses {0x000A001, . . . , 0x000A005, 0x000B009, 0x000A007, . . . , 0x000A00A, 0x000B00A, 0x000A00C}, such as 101111011111, starting from the lease significant bit (LSB) to the most significant bit (MSB) thereof, where Bits 0-11 of 101111011111 (e.g. the 12 bits starting from the LSB) may indicate the respectively continuity of the 12 subsequent physical addresses {0x000A001, . . . , 0x000A005, 0x000B009, 0x000A007, . . . , 0x000A00A, 0x000B00A, 0x000A00C}, respectively; regarding the HPB entry 1, the memory controller 110 may check respectively continuity of 12 subsequent physical addresses {0x000A002, . . . , 0x000A005, 0x000B009, 0x000A007, . . . , 0x000A00A, 0x000B00A, 0x000A00C, 0x000A00D} coming after the physical address 0x000A001 among the associated physical addresses {0x000A000, 0x000A001, . . . , 0x000A005, 0x000B009, 0x000A007, . . . , 0x000A00A, 0x000B00A, 0x000A00C, 0x000A00D, 0x000A00E, 0x000A00F, . . . }, to generate the continuous bit table 0xDEF indicating the respectively continuity of the 12 subsequent physical addresses {0x000A002, . . . , 0x000A005, 0x000B009, 0x000A007, . . . , 0x000A00A, 0x000B00A, 0x000A00C, 0x000A00D}, such as 110111101111, starting from the LSB to the MSB thereof, where Bits 0-11 of 110111101111 (e.g. the 12 bits starting from the LSB) may indicate the respectively continuity of the 12 subsequent physical addresses {0x000A002, . . . , 0x000A005, 0x000B009, 0x000A007, . . . , 0x000A00A, 0x000B00A, 0x000A00C, 0x000A00D}, respectively; and the rest may be deduced by analogy. As a result, the memory controller 110 may transmit the compact hybrid table CHT from the memory device 100 to the host device 50.

After the transmission of the compact hybrid table CHT from the memory device 100 to the host device 50 and the transmission of the corresponding compact hybrid table entry CHTE from the host device 50 to the memory device 100, the memory controller 110 may access the one or more sets of data in the NV memory 120 according to the compressed table entry CTE1 such as the associated physical address corresponding to the starting logical address (e.g. the physical address 0x000A000 of the HPB entry 0) and according to the continuity information table entry CITE such as the dedicated bit information DBI (e.g. the continuous bit table 0xBDF of the HPB entry 0, such as 101111011111) for the host device 50. For example, in a situation where only the physical addresses {0x000A000, 0x000A001, . . . , 0x000A005} are needed, the memory controller 110 may obtain all physical addresses (e.g. the physical addresses {0x000A000, 0x000A001, . . . , 0x000A005}) that are need in this reading operation of the one or more sets of data from the compressed table entry CTE1 and the continuity information table entry CITE, having no need to load the one or more additional local H2F address mapping tables of the plurality of local H2F address mapping tables from the NV memory 120, but the present invention is not limited thereto. For another example, in a situation where only the physical addresses {0x000A000, 0x000A001, . . . , 0x000A005, 0x000B009, 0x000A007, . . . , 0x000A00A} are needed, the memory controller 110 may obtain most physical addresses (e.g. most of the physical addresses {0x000A000, 0x000A001, . . . , 0x000A005, 0x000B009, 0x000A007, . . . , 0x000A00A}, except the physical address 0x000B009) that are need in this reading operation of the one or more sets of data from the compressed table entry CTE1 and the continuity information table entry CITE, and may merely load one additional local H2F address mapping table (e.g. a certain local H2F address mapping table having the physical address 0x000B009 among the plurality of local H2F address mapping tables) from the NV memory 120, having no need to load more than one additional local H2F address mapping tables of the plurality of local H2F address mapping tables from the NV memory 120.

Some implementation details regarding the continuous bit table may be described as follows. According to some embodiments, the logical values 1 and 0 in the continuous bit table may represent one or more portions of continuous addresses (e.g. {0x000A000, 0x000A001, . . . , 0x000A005}, {0x000A007, . . . , 0x000A00A}, etc.) and one or more non-continuous addresses (e.g. 0x000B009, 0x000B00A, etc.), respectively, where the memory controller 110 may obtain the one or more portions of continuous addresses from the compressed table entry CTE1 and the continuity information table entry CITE, and may obtain the one or more non-continuous addresses by loading one or more additional local H2F address mapping tables, but the present invention is not limited thereto. According to some embodiments, the logical values 0 and 1 in the continuous bit table may represent the one or more portions of continuous addresses (e.g. {0x000A000, 0x000A001, . . . , 0x000A005}, {0x000A007, . . . , 0x000A00A}, etc.) and the one or more non-continuous addresses (e.g. 0x000B009, 0x000B00A, etc.), respectively.

In the above embodiments, the HPB entry format (e.g. the dedicated bit information DBI, the compressed table entry CTE2, the compressed table entry CTE1) may be illustrated as shown in FIG. 5 or FIG. 6 for better comprehension, but the present invention is not limited thereto. According to some embodiments, the arrangement of the dedicated bit information DBI, the compressed table entry CTE2, the compressed table entry CTE1 may vary. According to some embodiments, the respective lengths (e.g. the respective bit counts) of the dedicated bit information DBI, the compressed table entry CTE2, the compressed table entry CTE1 may vary. According to some embodiments, the arrangement and the respective lengths (e.g. the respective bit counts) of the dedicated bit information DBI, the compressed table entry CTE2, the compressed table entry CTE1 may vary.

Figure 7:
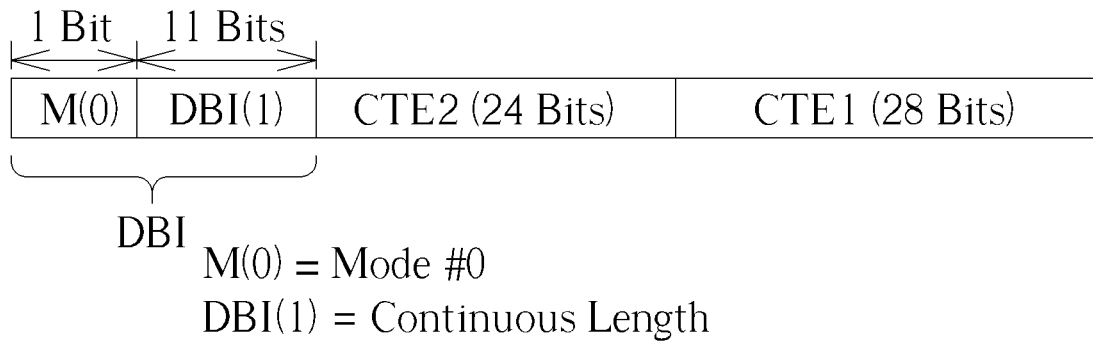
FIG. 7 illustrates an example of an adaptive HPB entry format of the control scheme shown in FIG. 4.
Figure 8:
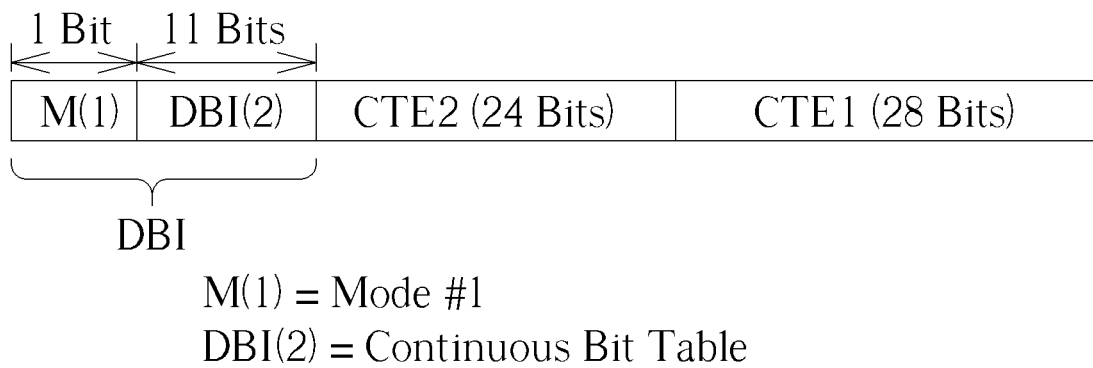
FIG. 8 illustrates another example of the adaptive HPB entry format.

FIG. 7 illustrates an example of an adaptive HPB entry format of the control scheme shown in FIG. 4, and FIG. 8 illustrates another example of the adaptive HPB entry format, where the adaptive HPB entry format is suitable for a HPB architecture conforming to the one or more newer specifications. According to the adaptive HPB entry format shown in FIG. 7 and FIG. 8, in the aforementioned any compact hybrid table entry CHTE of the multiple compact hybrid table entries {CHTE} of the compact hybrid table CHT, the compressed table entry CTE1 may have 28 bits, the compressed table entry CTE2 may have 24 bits, and the continuity information table entry CITE such as the dedicated bit information DBI may have 12 bits. In comparison with the examples shown in FIG. 5 and FIG. 6, at least one bit of the dedicated bit information DBI may be configured for indicating an operation mode such as one of multiple modes #0 and 1 in any of the examples shown in FIG. 7 and FIG. 8.

More particularly, the continuity information table entry CITE such as the dedicated bit information DBI shown in FIG. 7 may comprise the dedicated bit information DBI(1) and mode information M(0) respectively having 11 bits and 1 bit, where the dedicated bit information DBI(1) may represent the continuous length mentioned in the example shown in FIG. 5 except that the bit count thereof has been reduced by one (e.g. 12-1=11 (bits)), and the mode information M(0) may represent the mode #0 corresponding to the example shown in FIG. 5. In addition, the continuity information table entry CITE such as the dedicated bit information DBI shown in FIG. 8 may comprise the dedicated bit information DBI(2) and mode information M(1) respectively having 11 bits and 1 bit, where the dedicated bit information DBI(2) may represent the continuous bit table mentioned in the example shown in FIG. 6 except that the bit count thereof has been reduced by one (e.g. 12-1=11 (bits)), and the mode information M(1) may represent the mode #1 corresponding to the example shown in FIG. 6.

TABLE 4

| HPB entry | Mode | Continuous Length | CT2 Content | CT1 Content |
|---|---|---|---|---|
| 0 | 0x0 | 0x5 | 0x004030 | 0x000A000 |
| 1 | 0x0 | 0x4 | 0x004030 | 0x000A001 |
| 2 | 0x0 | 0x3 | 0x004030 | 0x000A002 |
| 3 | 0x0 | 0x2 | 0x004030 | 0x000A003 |
| 4 | 0x0 | 0x1 | 0x004030 | 0x000A004 |
| 5 | 0x0 | 0x0 | 0x004030 | 0x000A005 |
| 6 | 0x0 | 0x0 | 0x004030 | 0x000B009 |
| 7 | 0x0 | 0x3 | 0x004030 | 0x000A007 |
| 8 | 0x0 | 0x2 | 0x004030 | 0x000A008 |
| 9 | 0x0 | 0x1 | 0x004030 | 0x000A009 |
| 10 | 0x0 | 0x0 | 0x004030 | 0x000A00A |
| 11 | 0x0 | 0x0 | 0x004030 | 0x000B00A |
| 12 | 0x0 | . . . | 0x004030 | 0x000A00C |
| . . . | . . . | . . . | . . . | . . . |

Table 4 illustrates an example of the compact hybrid table CHT, where the notation " . . . " indicates that some table contents may be omitted for brevity. The HPB entries {0, 1, . . . } of Table 4 may represent the multiple compact hybrid table entries {CHTE}. In addition, the CT1 and CT2 contents (e.g. hexadecimal values) of Table 4 may represent the contents of the compressed tables CT1 and CT2 (e.g. the respective compressed table entries {CTE1} and {CTE2} of the compressed tables CT1 and CT2), respectively. The physical addresses {0x000A000, 0x000A001, . . . , 0x000A005, 0x000B009, 0x000A007, . . . , 0x000A00A, 0x000B00A, 0x000A00C, . . . } that appear in the CT1 contents may be taken as examples of the associated physical addresses corresponding to the series of logical addresses, and the physical address 0x004030 that repeatedly appears to be the physical addresses {0x004030, 0x004030, . . . } in the CT2 contents may be taken as an example of the physical address of the local H2F address mapping table.

Please note that the meanings of the continuous length in Table 4 may be similar to that in Table 2, and the mode in Table 4 may represent the mode information M(0) (e.g. 0x0 such as the logical value 0). For brevity, similar descriptions for this embodiment are not repeated in detail here.

TABLE 5

| HPB entry | Mode | Continuous Bit Table | CT2 Content | CT1 Content |
|---|---|---|---|---|
| 0 | 0x1 | 0x3DF (01111011111) | 0x004030 | 0x000A000 |
| 1 | 0x1 | 0x5EF (10111101111) | 0x004030 | 0x000A001 |
| 2 | 0x1 | 0x6F7 (11011110111) | 0x004030 | 0x000A002 |
| 3 | 0x1 | 0x77B (11101111011) | 0x004030 | 0x000A003 |
| 4 | 0x1 | . . . | 0x004030 | 0x000A004 |
| 5 | 0x1 | . . . | 0x004030 | 0x000A005 |
| 6 | 0x1 | . . . | 0x004030 | 0x000B009 |
| 7 | 0x1 | . . . | 0x004030 | 0x000A007 |
| 8 | 0x1 | . . . | 0x004030 | 0x000A008 |
| 9 | 0x1 | . . . | 0x004030 | 0x000A009 |
| 10 | 0x1 | . . . | 0x004030 | 0x000A00A |
| 11 | 0x1 | . . . | 0x004030 | 0x000B00A |
| 12 | 0x1 | . . . | 0x004030 | 0x000A00C |
| 13 | 0x1 | . . . | 0x004030 | 0x000A00D |
| 14 | 0x1 | . . . | 0x004030 | 0x000A00E |
| 15 | 0x1 | . . . | 0x004030 | 0x000A00F |
| . . . | . . . | . . . | . . . | . . . |

Table 5 illustrates an example of the compact hybrid table CHT, where the notation " . . . " indicates that some table contents may be omitted for brevity. The HPB entries {0, 1, . . . } of Table 5 may represent the multiple compact hybrid table entries {CHTE}. In addition, the CT1 and CT2 contents (e.g. hexadecimal values) of Table 5 may represent the contents of the compressed tables CT1 and CT2 (e.g. the respective compressed table entries {CTE1} and {CTE2} of the compressed tables CT1 and CT2), respectively. The physical addresses {0x000A000, 0x000A001, . . . , 0x000A005, 0x000B009, 0x000A007, . . . , 0x000A00A, 0x000B00A, 0x000A00C, . . . } that appear in the CT1 contents may be taken as examples of the associated physical addresses corresponding to the series of logical addresses, and the physical address 0x004030 that repeatedly appears to be the physical addresses {0x004030, 0x004030, . . . } in the CT2 contents may be taken as an example of the physical address of the local H2F address mapping table.

Please note that the meanings of the continuous bit table in Table 5 may be similar to that in Table 3, and the mode in Table 5 may represent the mode information M(1) (e.g. 0x1 such as the logical value 1). For brevity, similar descriptions for this embodiment are not repeated in detail here.

Figure 9:
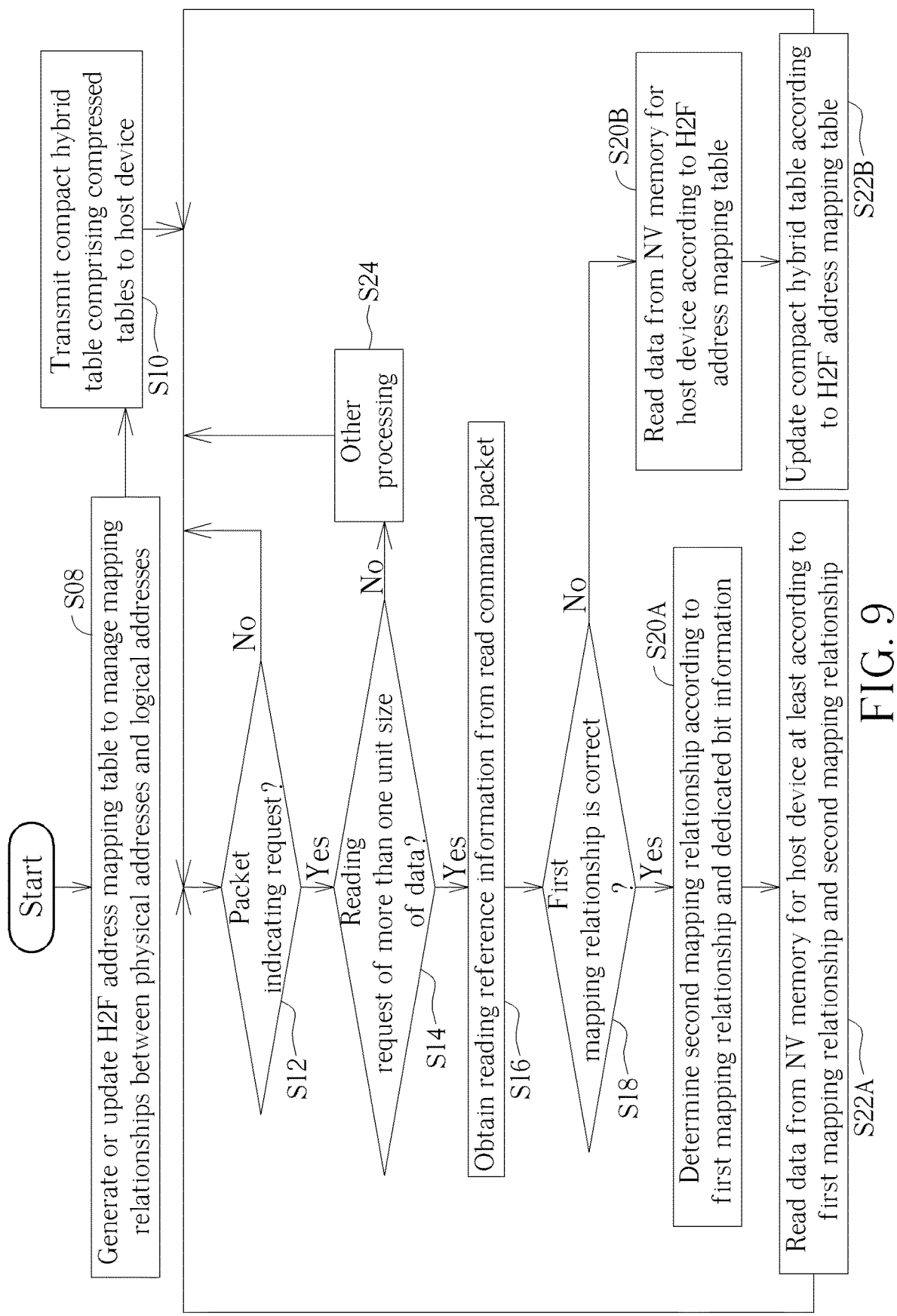
FIG. 9 illustrates a flowchart of the method for performing access management of the memory device such as that shown in FIG. 1 with the aid of the dedicated bit information according to an embodiment of the present invention.

FIG. 9 illustrates a flowchart of the method for performing access management of the memory device such as that shown in FIG. 1 with the aid of the dedicated bit information DBI (e.g. DBI(1), DBI(2), etc.) according to an embodiment of the present invention. The working flow shown in FIG. 9 can be applied to the memory device 100, and more particularly, the memory controller 110 therein.

In Step S08, the memory controller 110 can be configured to generate or update the aforementioned at least one H2F address mapping table (e.g. the global H2F address mapping table 120T) to manage the mapping relationships between the multiple physical addresses and the multiple logical addresses, for controlling data access of the NV memory 120. For example, the memory controller 110 can perform garbage collection to collect valid data into one or more new physical blocks in the NV memory 120, and update the aforementioned at least one H2F address mapping table (e.g. the global H2F address mapping table 120T) correspondingly, but the present invention is not limited thereto. In addition, the memory controller 110 can generate the compact hybrid table CHT mentioned in the embodiment shown in FIG. 4 according to at least one portion (e.g. a portion or all) of the aforementioned at least one H2F address mapping table (e.g. the global H2F address mapping table 120T), in order to enhance overall performance of the electronic device 10, where any compact hybrid table entry CHTE of the multiple compact hybrid table entries {CHTE} of the compact hybrid table CHT may comprise a portion of mapping information in the aforementioned at least one H2F address mapping table, such as a certain physical address associated with a certain logical address of the series of logical addresses.

According to this embodiment, the NV memory 120 can be configured to store the aforementioned at least one H2F address mapping table (e.g. the global H2F address mapping table 120T), for controlling data access of the NV memory 120, and the aforementioned any compact hybrid table entry CHTE of the multiple compact hybrid table entries {CHTE} of the compact hybrid table CHT may further comprise protection information regarding the portion of mapping information. In addition, the protection information may indicate a storage location of the portion of mapping information within the NV memory 120. For example, the aforementioned at least one H2F address mapping table may represent the global H2F address mapping table 120T comprising the plurality of local H2F address mapping tables, and the storage location of the portion of mapping information may represent a physical address of a local H2F address mapping table of the plurality of local H2F address mapping tables, where the portion of mapping information, such as the physical address associated with the logical address of the series of logical addresses, is recorded in the local H2F address mapping table.

In Step S10, the memory controller 110 can be configured to transmit the compact hybrid table CHT comprising multiple compressed tables (e.g. the compressed tables CT1 and CT2 mentioned in the embodiment shown in FIG. 4) to the host device 50, for being stored in the host device 50, to allow the host device 50 to send one of the multiple compact hybrid table entries {CHTE} of the compact hybrid table CHT to the memory device 100 to be reading reference, for enhancing reading performance (e.g. increasing reading speed) of the memory device 100, where the multiple compact hybrid table entries {CHTE} of the compact hybrid table CHT have a same size (e.g. 8 bytes), which means the length of each of the multiple compact hybrid table entries {CHTE} is equal to this size (e.g. 8 bytes).

In Step S12, the memory controller 110 can be configured to determine whether the host device 50 sends at least one packet for indicating at least one request to the memory device 100. If Yes (e.g. the memory controller 110 receives the aforementioned at least one packet from the host device 50), Step S14 is entered; if No (e.g. the memory controller 110 receives no packet from the host device 50), Step S12 is entered, in order to wait for the aforementioned at least one packet from the host device 50.

In Step S14, in response to the host device 50 sending the aforementioned at least one packet for indicating the aforementioned at least one request, the memory controller 110 can be configured to determine whether a reading request of more than one unit size of data (e.g. the reading request mentioned the embodiment shown in FIG. 4, such as a request of data reading of more than one logical address/LBA, where the transfer length is greater than one) among the aforementioned at least one request exists. The unit size may represent a predetermined unit size corresponding to a single logical address such as a single LBA, but the present invention is not limited thereto. If Yes (e.g. the reading request such as the request of data reading of more than one logical address exists, where the transfer length is greater than one), Step S16 is entered, for operating according to the reading request; if No (e.g. the reading request such as the request of data reading of more than one logical address does not exist, and more particularly, the aforementioned at least one request may comprise a non-reading request such as a writing request, or another type of reading request, such as a request of data reading of only one logical address with the transfer length being equal to one), Step S24 is entered, for operating according to other request(s). For example, a read command packet (e.g. the HPB READ command, more particularly, the command packet thereof) carrying at least the starting logical address and the data length of the reading request among the aforementioned at least one packet may indicate the reading request. In this situation, the reading request exists, and Step S16 is entered.

In Step S16, in response to existence of the reading request, the memory controller 110 can be configured to obtain reading reference information from the read command packet (e.g. the HPB READ command, more particularly, the command packet thereof), wherein the reading reference information carried by the read command packet may comprise first mapping information indicating a first mapping relationship (e.g. a mapping relationship between a first physical address and the starting logical address) and comprise the dedicated bit information DBI. For example, the reading reference information may represent the corresponding compact hybrid table entry CHTE of the multiple compact hybrid table entries {CHTE} of the compact hybrid table CHT (e.g. the compact hybrid table entry CHTE corresponding to the reading request among the multiple compact hybrid table entries {CHTE} of the compact hybrid table CHT), where the first mapping relationship (e.g. the mapping relationship between the first physical address and the starting logical address) can be a first H2F address mapping relationship indicated by the compressed table entry CTE1 in the corresponding compact hybrid table entry CHTE.

In Step S18, the memory controller 110 can be configured to determine whether the first mapping relationship (e.g. the mapping relationship between the first physical address and the starting logical address, such as the first H2F address mapping relationship indicated by the compressed table entry CTE1 in the corresponding compact hybrid table entry CHTE) is correct according to the compressed table entry CTE2 in the corresponding compact hybrid table entry CHTE. If Yes, Step S20A is entered; if No, Step S20B is entered.

In Step S20A, the memory controller 110 can be configured to determine at least one second mapping relationship according to the first mapping relationship and the dedicated bit information DBI (e.g. DBI(1), DBI(2), etc.), for reading data of the data length that starts from the starting logical address. For example, the first mapping relationship may represent the mapping relationship between the first physical address and the starting logical address, such as the first H2F address mapping relationship indicated by the compressed table entry CTE1 in the corresponding compact hybrid table entry CHTE, and the aforementioned at least one second mapping relationship may represent at least one mapping relationship between at least one second physical address and at least one subsequent logical address, such as at least one second H2F address mapping relationship indicated by the dedicated bit information DBI in the corresponding compact hybrid table entry CHTE.

In Step S22A, the memory controller 110 can be configured to read the data from the NV memory 120 for the host device 50 at least according to the first mapping relationship and the aforementioned at least one second mapping relationship. Afterward, Step S12 is entered.

In Step S20B, the memory controller 110 can be configured to read the data from the NV memory 120 for the host device 50 according to the aforementioned at least one H2F address mapping table (e.g. the global H2F address mapping table 120T, and more particularly, at least one local H2F address mapping table of the plurality of local H2F address mapping tables).

In Step S22B, the memory controller 110 can be configured to update the compact hybrid table CHT according to the aforementioned at least one H2F address mapping table (e.g. the global H2F address mapping table 120T, and more particularly, the aforementioned at least one local H2F address mapping table of the plurality of local H2F address mapping tables). For example, in the operation of Step S22B, the memory controller 110 can generate an updated version of the compact hybrid table CHT and transmit the updated version of the compact hybrid table CHT to the host device 50, for being stored in the host device 50, to replace the existing version of the compact hybrid table CHT in the host device 50. Afterward, Step S12 is entered.

In Step S24, the memory controller 110 can be configured to perform other processing corresponding to the other request(s). For example, in response to the host device 50 sending the at least one packet for indicating the at least one request, the memory controller 110 determines whether a writing request among the at least one request exists. When the writing request among the at least one request exists, the memory controller 110 can be configured to perform data writing (e.g. data programming) on the NV memory 120, and to update the aforementioned at least one H2F address mapping table (e.g. the global H2F address mapping table 120T, and more particularly, one or more of the plurality of local H2F address mapping tables) correspondingly, for indicating at least one latest mapping relationship between at least one physical address and at least one logical address of the data writing. For another example, in response to the host device 50 sending the at least one packet for indicating the at least one request, the memory controller 110 determines whether a request of data reading of only one logical address (e.g. the transfer length is equal to one) exists. When the request of data reading of only one logical address exists, the memory controller 110 can be configured to read the data of the only one logical address from the NV memory 120, for example, by performing the same operation as that of Step S18, and then either performing an operation that is similar to the operation of Step S22A without using the second mapping relationship (for the case that the first mapping relationship is correct) or performing the same operations as that of Steps S20B and S22B (for the case that the first mapping relationship is incorrect). As the transfer length is equal to one for this request, there is no need to determine the second mapping relationship as mentioned in Step S20A. Afterward, Step S12 is entered. For brevity, similar descriptions for this embodiment are not repeated in detail here.

For better comprehension, the method may be illustrated with the working flow shown in FIG. 9, but the present invention is not limited thereto. According to some embodiments, one or more steps may be added, deleted, or changed in the working flow shown in FIG. 9.

Figure 10:
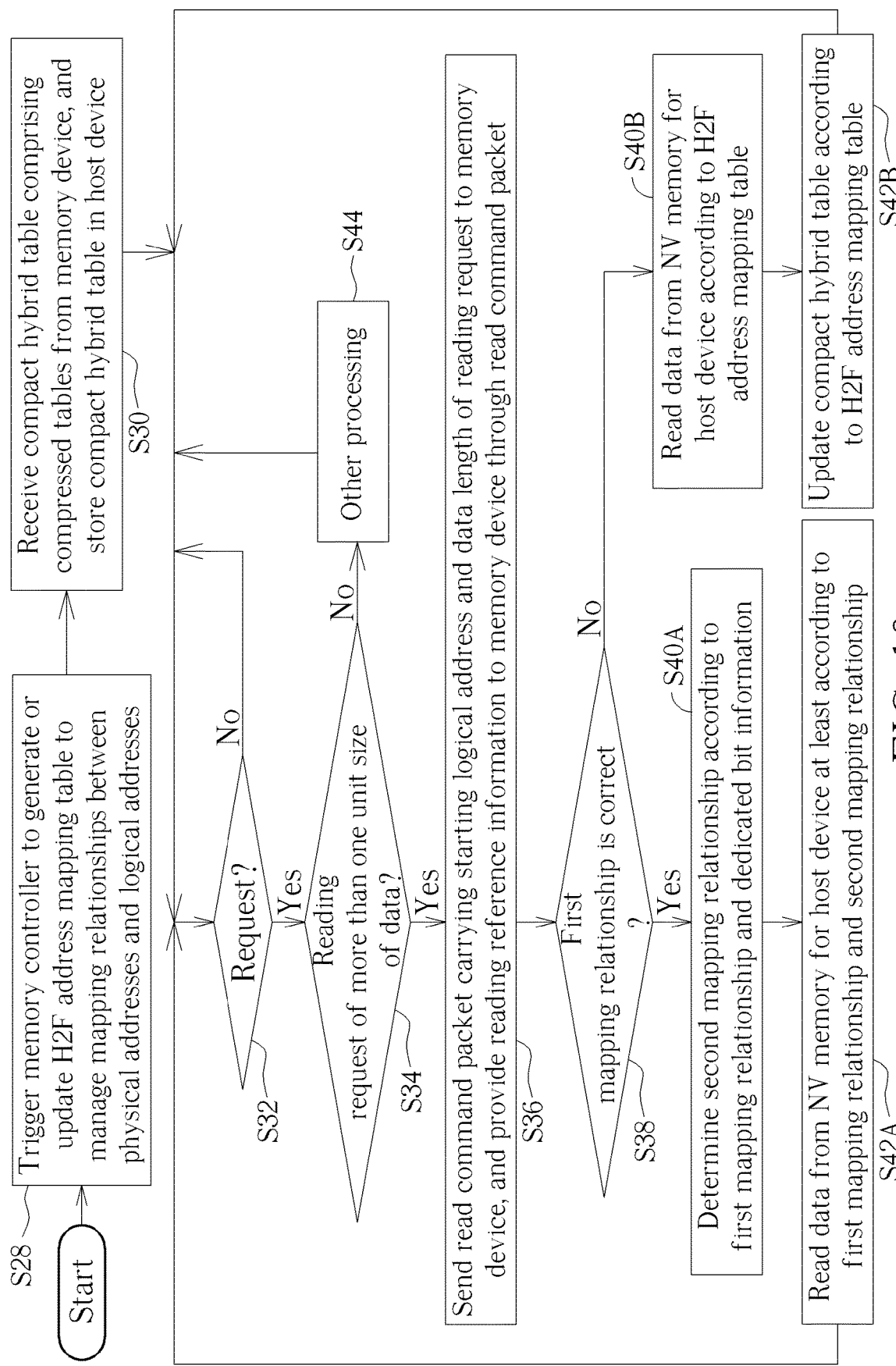
FIG. 10 illustrates a flowchart of the method for performing access management of the memory device such as that shown in FIG. 1 with the aid of the dedicated bit information according to another embodiment of the present invention.

FIG. 10 illustrates a flowchart of the method for performing access management of the memory device such as that shown in FIG. 1 with the aid of the dedicated bit information DBI (e.g. DBI(1), DBI(2), etc.) according to an embodiment of the present invention. The working flow shown in FIG. 10 can be applied to the host device 50, and more particularly, the processor 52 running associated program modules (e.g. an operating system (OS), one or more drivers, and/or one or more application programs). For example, the operations of Steps S28-S44 in the working flow shown in FIG. 10 may correspond to the operations of Steps S08-S24 in the working flow shown in FIG. 9, respectively, but the present invention is not limited thereto.

In Step S28, the host device 50 can trigger the memory controller 110 to generate or update the aforementioned at least one H2F address mapping table (e.g. the global H2F address mapping table 120T) to manage the mapping relationships between the multiple physical addresses and the multiple logical addresses, for controlling data access of the NV memory 120.

In Step S30, the host device 50 can be configured to receive the compact hybrid table CHT comprising the multiple compressed tables (e.g. the compressed tables CT1 and CT2 mentioned in the embodiment shown in FIG. 4) from the memory device 100 (e.g. the memory controller 110 therein), and to store the compact hybrid table CHT in the host device 50 (e.g. store the compact hybrid table CHT as the hybrid table 56T in the RAM 56 of the host device 50), for sending one of the multiple compact hybrid table entries {CHTE} of the compact hybrid table CHT to the memory device 100 to be reading reference, for enhancing reading performance (e.g. increasing reading speed) of the memory device 100, where the multiple compact hybrid table entries {CHTE} of the compact hybrid table CHT have the same size (e.g. 8 bytes).

In Step S32, the host device 50 can be configured to determine whether at least one request from a user of the host device 50, such as the aforementioned at least one request in Step S12, is received. If Yes (e.g. the aforementioned at least one request from the user is received), Step S34 is entered; if No (e.g. no request from the user is received), Step S32 is entered, in order to wait for the aforementioned at least one request from the user.

In Step S34, in response to the aforementioned at least one request from the user of the host device 50 being received, the host device 50 can be configured to determine whether a reading request of more than one unit size of data (e.g. the reading request mentioned the embodiment shown in FIG. 4, such as the request of data reading of more than one logical address/LBA, where the transfer length is greater than one) among the aforementioned at least one request exists. If Yes (e.g. the reading request such as the request of data reading of more than one logical address exists, where the transfer length is greater than one), Step S36 is entered, for operating according to the reading request; if No (e.g. the reading request such as the request of data reading of more than one logical address does not exist, and more particularly, the aforementioned at least one request may comprise a non-reading request such as a writing request, or another type of reading request, such as a request of data reading of only one logical address with the transfer length being equal to one), Step S44 is entered, for operating according to other request (s).

In Step S36, in response to existence of the reading request, the host device 50 can be configured to send a read command packet (e.g. the HPB READ command, more particularly, the command packet thereof) carrying at least the starting logical address and the data length of the reading request to the memory device 100 (e.g. the memory controller 110 therein), and to provide reading reference information to the memory device 100 (e.g. the memory controller 110 therein) through the read command packet, where the read command packet indicates the reading request, and the reading reference information carried by the read command packet comprises first mapping information indicating a first mapping relationship (e.g. the first mapping relationship of Step S16 shown in FIG. 9, such as the mapping relationship between the first physical address and the starting logical address) and the dedicated bit information DBI. For example, the reading reference information may represent the corresponding compact hybrid table entry CHTE of the multiple compact hybrid table entries {CHTE} of the compact hybrid table CHT (e.g. the compact hybrid table entry CHTE corresponding to the reading request among the multiple compact hybrid table entries {CHTE} of the compact hybrid table CHT), and the first mapping relationship (e.g. the mapping relationship between the first physical address and the starting logical address) can be the first H2F address mapping relationship indicated by the compressed table entry CTE1 in the corresponding compact hybrid table entry CHTE.

In Step S38, the host device 50 can utilize the memory controller 110 to determine whether the first mapping relationship (e.g. the mapping relationship between the first physical address and the starting logical address, such as the first H2F address mapping relationship indicated by the compressed table entry CTE1 in the corresponding compact hybrid table entry CHTE) is correct according to the compressed table entry CTE2 in the corresponding compact hybrid table entry CHTE. If Yes, Step S40A is entered; if No, Step S40B is entered.

In Step S40A, the host device 50 can utilize the memory controller 110 to determine at least one second mapping relationship (e.g. the at least one second mapping relationship of Step S20A shown in FIG. 9) according to the first mapping relationship and the dedicated bit information DBI (e.g. DBI(1), DBI(2), etc.), for reading data of the data length that starts from the starting logical address.

In Step S42A, the host device 50 can utilize the memory controller 110 to read the data from the NV memory 120 for the host device 50 at least according to the first mapping relationship and the aforementioned at least one second mapping relationship.

In Step S40B, the host device 50 can utilize the memory controller 110 to read the data from the NV memory 120 for the host device 50 according to the aforementioned at least one H2F address mapping table (e.g. the global H2F address mapping table 120T, and more particularly, at least one local H2F address mapping table of the plurality of local H2F address mapping tables).

In Step S42B, the host device 50 can utilize the memory controller 110 to update the compact hybrid table CHT according to the aforementioned at least one H2F address mapping table (e.g. the global H2F address mapping table 120T, and more particularly, the aforementioned at least one local H2F address mapping table of the plurality of local H2F address mapping tables). For example, in the operation of Step S42B, the memory controller 110 can generate the updated version of the compact hybrid table CHT and transmit the updated version of the compact hybrid table CHT to the host device 50, and the host device 50 can store the updated version of the compact hybrid table CHT in the host device 50 (e.g. store the updated version of the compact hybrid table CHT as the hybrid table 56T in the RAM 56 of the host device 50), to replace the existing version of the compact hybrid table CHT in the host device 50. Afterward, Step S32 is entered.

In Step S44, the host device 50 can perform other processing corresponding to the other request(s), and more particularly, can utilize the memory controller 110 to perform some processing corresponding to one or more other requests. For example, when a writing request among the at least one request exists, the host device 50 can be configured to send a write command, a logical address, etc., as well as the data being written, to the memory device 100 (e.g. the memory controller 110 therein). As a result, the memory controller 110 can perform data writing (e.g. data programming) on the NV memory 120, and update the aforementioned at least one H2F address mapping table (e.g. the global H2F address mapping table 120T, and more particularly, one or more of the plurality of local H2F address mapping tables) correspondingly, for indicating at least one latest mapping relationship between at least one physical address and at least one logical address of the data writing. For another example, when a request of data reading of only one logical address exists, the host device 50 can utilize the memory controller 110 to read the data of the only one logical address from the NV memory 120, for example, by performing the same operation as that of Step S38, and then either performing an operation that is similar to the operation of Step S42A without using the second mapping relationship (for the case that the first mapping relationship is correct) or performing the same operations as that of Steps S40B and S42B (for the case that the first mapping relationship is incorrect). As the transfer length is equal to one for this request, there is no need to determine the second mapping relationship as mentioned in Step S40A. Afterward, Step S32 is entered. For brevity, similar descriptions for this embodiment are not repeated in detail here.

For better comprehension, the method may be illustrated with the working flow shown in FIG. 10, but the present invention is not limited thereto. According to some embodiments, one or more steps may be added, deleted, or changed in the working flow shown in FIG. 10.

According to some embodiments, the dedicated bit information DBI within the reading reference information carried by the read command packet indicates continuity of a set of physical addresses starting from a physical address among the associated physical addresses recorded in the multiple compact hybrid table entries {CHTE}, wherein the physical address is associated with the starting logical address. In addition, the multiple compressed tables (e.g. the compressed tables CT1 and CT2) within the compact hybrid table CHT correspond to multiple tables (e.g. the tables T1 and T2) within the hybrid table HT, respectively, and are respective compressed versions of the multiple tables within the hybrid table HT; and the compact hybrid table CHT has a same bit width (e.g. 64 bits, which is equal to 8 bytes) as the hybrid table HT. For example, the compact hybrid table CHT is configured to carry the continuity information table CIT in a released bit width (e.g. 12 bits, i.e. (64−(24+28)) bits) within said same bit width (e.g. 64 bits), wherein an entry length of any compact hybrid table entry CHTE of the multiple compact hybrid table entries {CHTE} is equal to said same bit width, and the continuity information table CIT comprises the dedicated bit information DBI. For another example, the multiple compressed tables (e.g. the compressed tables CT1 and CT2) have been compressed from the multiple tables (e.g. the tables T1 and T2) within the hybrid table HT, to make the compact hybrid table CHT having the same bit width (e.g. 64 bits) as the hybrid table HT carry the dedicated bit information DBI. In some examples, the memory controller 110 can be configured to obtain the compact hybrid table CHT by compressing the multiple tables (e.g. the tables T1 and T2) within the hybrid table HT to generate the multiple compressed tables (e.g. the compressed tables CT1 and CT2) and combining the multiple compressed tables and the continuity information table CIT carrying the dedicated bit information DBI.

According to some embodiments, the read command packet represents a HPB entry packet such as that mentioned above, where the HPB entry packet conforms to HPB specification such as HPB 1.0, HPB 2.0, etc. As mentioned, the dedicated bit information DBI may indicate the continuity of the set of physical addresses starting from the physical address among the associated physical addresses recorded in the multiple compact hybrid table entries {CHTE}. For example, the dedicated bit information DBI (e.g. DBI(1)) may represent a continuous length such as that mentioned above. For another example, the dedicated bit information DBI (e.g. DBI(2)) may represent a continuous bit table such as that mentioned above.

According to some embodiments, the corresponding compact hybrid table entry CHTE of the multiple compact hybrid table entries {CHTE} comprises a first compressed table entry of a first compressed table of the multiple compressed tables and a second compressed table entry of a second compressed table of the multiple compressed tables, such as the compressed table entry CTE1 of the compressed table CT1 and the compressed table entry CTE2 of the compressed table CT2. According to the second compressed table entry (e.g. the compressed table entry CTE2), the memory controller 110 can be configured to determine whether the first compressed table entry (e.g. the compressed table entry CTE1) is correct to generate a determination result, wherein the determination result indicates whether the first compressed table entry is correct. For example, in response to the determination result indicating that the first compressed table entry (e.g. the compressed table entry CTE1) is correct, an operation of determining the aforementioned at least one second mapping relationship according to the first mapping relationship and the dedicated bit information DBI is performed. In addition, the first compressed table entry may represent the physical address associated with the starting logical address. More particularly, in a situation where the first compressed table entry is correct, the first compressed table entry represents the latest physical address associated with the starting logical address.

FIG. 11 illustrates the command packet of the HPB READ command that carries the corresponding compact hybrid table entry CHTE in the control scheme shown in FIG. 4 according to an embodiment of the present invention, where the command packet shown in FIG. 11 can be taken as an example of the HPB entry packet carrying the corresponding compact hybrid table entry CHTE. In this command packet, Byte 0 may carry the operation code such as a predetermined hexadecimal value F8h, Byte 1 may be reserved, Bytes 2-5 may carry the logical block address (LBA), Bytes 6-13 may carry this compact hybrid table entry CHTE, Byte 14 may carry the transfer length, and Byte 15 may carry the Control information such as another hexadecimal value ooh, where Bits 7 and 0 of any byte of Bytes 0-15 may represent the MSB and the LSB of this byte, respectively. For brevity, similar descriptions for this embodiment are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing access management of a memory device with aid of dedicated bit information, the memory device comprising a non-volatile (NV) memory, the NV memory comprising at least one NV memory element, the method being applicable to the memory device, the method comprising:

transmitting a compact hybrid table comprising multiple compressed tables to a host device, for being stored in the host device, to allow the host device to send one of multiple compact hybrid table entries of the compact hybrid table to the memory device to be reading reference, for enhancing reading performance of the memory device, wherein the multiple compact hybrid table entries of the compact hybrid table have a same size;

in response to the host device sending at least one packet for indicating at least one request, determining whether a reading request among the at least one request exists, wherein a read command packet carrying at least a starting logical address and a data length of the reading request among the at least one packet indicates the reading request;

in response to existence of the reading request, obtaining reading reference information from the read command packet, wherein the reading reference information carried by the read command packet comprises first mapping information indicating a first mapping relationship and comprises the dedicated bit information, and the reading reference information represents a corresponding compact hybrid table entry of the multiple compact hybrid table entries of the compact hybrid table;

determining at least one second mapping relationship according to the first mapping relationship and the dedicated bit information, for reading data of the data length that starts from the starting logical address; and reading the data from the NV memory for the host device at least according to the first mapping relationship and the at least one second mapping relationship.

2. The method of claim 1, further comprising:

before transmitting the compact hybrid table to the host device, generating or updating at least one logical-to-physical (H2F) address mapping table to manage mapping relationships between multiple physical addresses and multiple logical addresses, for controlling data access of the NV memory, wherein any compact hybrid table entry of the multiple compact hybrid table entries of the compact hybrid table comprises a portion of mapping information in the at least one H2F address mapping table.

3. The method of claim 2, wherein the NV memory is configured to store the at least one H2F address mapping table, for controlling data access of the NV memory; and said any compact hybrid table entry of the multiple compact hybrid table entries of the compact hybrid table further comprises protection information regarding the portion of mapping information, wherein the protection information indicates a storage location of the portion of mapping information within the NV memory.

4. The method of claim 3, wherein the at least one H2F address mapping table represents a global H2F address mapping table comprising a plurality of local H2F address mapping tables, and the storage location of the portion of mapping information represents a physical address of a local H2F address mapping table of the plurality of local H2F address mapping tables, wherein the portion of mapping information is recorded in the local H2F address mapping table.

5. The method of claim 1, wherein the first mapping relationship represents a mapping relationship between a first physical address and the starting logical address, and the at least one second mapping relationship represents at least one mapping relationship between at least one second physical address and at least one subsequent logical address.

6. The method of claim 1, wherein the compact hybrid table comprises the multiple compact hybrid table entries respectively corresponding to a series of logical addresses, and is configured for mapping the series of logical addresses to associated physical addresses recorded in the multiple compact hybrid table entries, respectively.

7. The method of claim 1, wherein any compact hybrid table entry of the multiple compact hybrid table entries comprises a first compressed table entry of a first compressed table of the multiple compressed tables and a second compressed table entry of a second compressed table of the multiple compressed tables, and comprises a continuity information table entry of a continuity information table.

8. The method of claim 7, wherein the first compressed table and the second compressed table represents a local logical-to-physical (H2F) address mapping table of the memory device and a protection information table comprising corresponding protection information of the local H2F address mapping table, respectively, and the continuity information table comprises the dedicated bit information.

9. The method of claim 7, wherein the compact hybrid table comprises the multiple compact hybrid table entries respectively corresponding to a series of logical addresses, and is configured for mapping the series of logical addresses to associated physical addresses recorded in the multiple compact hybrid table entries, respectively; and the first compressed table entry represents a physical address of the associated physical addresses recorded in the multiple compact hybrid table entries, the second compressed table entry represents protection information of a local logical-to-physical (H2F) address mapping table of the memory device.

10. The method of claim 9, wherein the protection information of the local H2F address mapping table comprises the physical address of the local H2F address mapping table, and is utilized for checking whether the local H2F address mapping table is correct or checking whether the physical address is correct when said any compact hybrid table entry is sent back from the host device to the memory device.

11. The method of claim 9, wherein the continuity information table entry indicates continuity of a set of physical addresses starting from the physical address among the associated physical addresses recorded in the multiple compact hybrid table entries.

12. The method of claim 7, wherein in a situation where said any compact hybrid table entry of the multiple compact hybrid table entries represents the corresponding compact hybrid table entry, the continuity information table entry represents the dedicated bit information.

13. The method of claim 1, wherein the dedicated bit information indicates continuity of a set of physical addresses starting from a physical address among associated physical addresses recorded in the multiple compact hybrid table entries, wherein the physical address is associated with the starting logical address.

14. The method of claim 1, wherein the corresponding compact hybrid table entry of the multiple compact hybrid table entries comprises a first compressed table entry of a first compressed table of the multiple compressed tables and a second compressed table entry of a second compressed table of the multiple compressed tables; and the method further comprises:

according to the second compressed table entry, determining whether the first compressed table entry is correct to generate a determination result, wherein the determination result indicates whether the first compressed table entry is correct;

wherein in response to the determination result indicating that the first compressed table entry is correct, an operation of determining the at least one second mapping relationship according to the first mapping relationship and the dedicated bit information is performed.

15. The method of claim 14, wherein the first compressed table entry represents a physical address associated with the starting logical address.

16. A memory device, comprising:

a non-volatile (NV) memory, arranged to store information, wherein the NV memory comprises at least one NV memory element; and a controller, coupled to the NV memory, arranged to control operations of the memory device, wherein the controller comprises:

a processing circuit, arranged to control the controller according to a plurality of host commands from a host device, to allow the host device to access the NV memory through the controller, wherein:

the controller transmits a compact hybrid table comprising multiple compressed tables to the host device, for being stored in the host device, to allow the host device to send one of multiple compact hybrid table entries of the compact hybrid table to the memory device to be reading reference, for enhancing reading performance of the memory device, wherein the multiple compact hybrid table entries of the compact hybrid table have a same size;

in response to the host device sending at least one packet for indicating at least one request, the controller determines whether a reading request among the at least one request exists, wherein a read command packet carrying at least a starting logical address and a data length of the reading request among the at least one packet indicates the reading request;

in response to existence of the reading request, the controller obtains reading reference information from the read command packet, wherein the reading reference information carried by the read command packet comprises first mapping information indicating a first mapping relationship and comprises the dedicated bit information, and the reading reference information represents a corresponding compact hybrid table entry of the multiple compact hybrid table entries of the compact hybrid table;

the controller determines at least one second mapping relationship according to the first mapping relationship and the dedicated bit information, for reading data of the data length that starts from the starting logical address; and the controller reads the data from the NV memory for the host device at least according to the first mapping relationship and the at least one second mapping relationship.

17. The memory device of claim 16, wherein before transmitting the compact hybrid table to the host device, the controller generates or updates at least one logical-to-physical (H2F) address mapping table to manage mapping relationships between multiple physical addresses and multiple logical addresses, for controlling data access of the NV memory, wherein any compact hybrid table entry of the multiple compact hybrid table entries of the compact hybrid table comprises a portion of mapping information in the at least one H2F address mapping table.

18. The memory device of claim 17, wherein the NV memory is configured to store the at least one H2F address mapping table, for controlling data access of the NV memory; and said any compact hybrid table entry of the multiple compact hybrid table entries of the compact hybrid table further comprises protection information regarding the portion of mapping information, wherein the protection information indicates a storage location of the portion of mapping information within the NV memory.

19. The memory device of claim 18, wherein the at least one H2F address mapping table represents a global H2F address mapping table comprising a plurality of local H2F address mapping tables, and the storage location of the portion of mapping information represents a physical address of a local H2F address mapping table of the plurality of local H2F address mapping tables, wherein the portion of mapping information is recorded in the local H2F address mapping table.

20. An electronic device comprising the memory device of claim 16, and further comprising:

the host device, coupled to the memory device, wherein the host device comprises:
at least one processor, arranged for controlling operations of the host device; and
a power supply circuit, coupled to the at least one processor, arranged for providing power to the at least one processor and the memory device;
wherein the memory device provides the host device with storage space.

21. A controller of a memory device, the memory device comprising the controller and a non-volatile (NV) memory, the NV memory comprising at least one NV memory element, the controller comprising:
a processing circuit, arranged to control the controller according to a plurality of host commands from a host device, to allow the host device to access the NV memory through the controller, wherein:
the controller transmits a compact hybrid table comprising multiple compressed tables to the host device, for being stored in the host device, to allow the host device to send one of multiple compact hybrid table entries of the compact hybrid table to the memory device to be reading reference, for enhancing reading performance of the memory device, wherein the multiple compact hybrid table entries of the compact hybrid table have a same size;
in response to the host device sending at least one packet for indicating at least one request, the controller determines whether a reading request among the at least one request exists, wherein a read command packet carrying at least a starting logical address and a data length of the reading request among the at least one packet indicates the reading request;
in response to existence of the reading request, the controller obtains reading reference information from the read command packet, wherein the reading reference information carried by the read command packet comprises first mapping information indicating a first mapping relationship and comprises the dedicated bit information, and the reading reference information represents a corresponding compact hybrid table entry of the multiple compact hybrid table entries of the compact hybrid table;
the controller determines at least one second mapping relationship according to the first mapping relationship and the dedicated bit information, for reading data of the data length that starts from the starting logical address; and
the controller reads the data from the NV memory for the host device at least according to the first mapping relationship and the at least one second mapping relationship.

22. A method for performing access management of a memory device with aid of dedicated bit information, the memory device comprising a non-volatile (NV) memory, the NV memory comprising at least one NV memory element, the method being applicable to a host device, the method comprising:
receiving a compact hybrid table comprising multiple compressed tables from the memory device, and storing the compact hybrid table in the host device, for sending one of multiple compact hybrid table entries of the compact hybrid table to the memory device to be reading reference, for enhancing reading performance of the memory device, wherein the multiple compact hybrid table entries of the compact hybrid table have a same size;

in response to at least one request from a user of the host device being received, determining whether a reading request among the at least one request exists;

in response to existence of the reading request, sending a read command packet carrying at least a starting logical address and a data length of the reading request to the memory device, and providing reading reference information to the memory device through the read command packet, wherein the read command packet indicates the reading request, the reading reference information carried by the read command packet comprises first mapping information indicating a first mapping relationship and comprises the dedicated bit information, and the reading reference information represents a corresponding compact hybrid table entry of the multiple compact hybrid table entries of the compact hybrid table;

utilizing a memory controller within the memory device to determine at least one second mapping relationship according to the first mapping relationship and the dedicated bit information, for reading data of the data length that starts from the starting logical address; and utilizing the memory controller to read the data from the NV memory for the host device at least according to the first mapping relationship and the at least one second mapping relationship.

23. A host device, applicable to performing access management of a memory device with aid of dedicated bit information, the memory device comprising a non-volatile (NV) memory, the NV memory comprising at least one NV memory element, the host device comprising:

at least one processor, arranged for controlling operations of the host device;

at least one random access memory (RAM), coupled to the at least one processor, arrange for storing information within the host device; and a power supply circuit, coupled to the at least one processor, arranged for providing power to the at least one processor and the memory device;

wherein:

the host device is configured to receive a compact hybrid table comprising multiple compressed tables from the memory device, and to store the compact hybrid table in the at least one RAM of the host device, for sending one of multiple compact hybrid table entries of the compact hybrid table to the memory device to be reading reference, for enhancing reading performance of the memory device, wherein the multiple compact hybrid table entries of the compact hybrid table have a same size;

in response to at least one request from a user of the host device being received, the host device is configured to determine whether a reading request among the at least one request exists;

in response to existence of the reading request, the host device is configured to send a read command packet carrying at least a starting logical address and a data length of the reading request to the memory device, and to provide reading reference information to the memory device through the read command packet, wherein the read command packet indicates the reading request, the reading reference information carried by the read command packet comprises first mapping information indicating a first mapping relationship and comprises the dedicated bit information, and the reading reference information represents a corresponding compact hybrid table entry of the multiple compact hybrid table entries of the compact hybrid table;

the host device utilizes a memory controller within the memory device to determine at least one second mapping relationship according to the first mapping relationship and the dedicated bit information, for reading data of the data length that starts from the starting logical address; and the host device utilizes the memory controller to read the data from the NV memory for the host device at least according to the first mapping relationship and the at least one second mapping relationship.

* * * * *